US012761780B2

(12) United States Patent
Han et al.

(10) Patent No.: US 12,761,780 B2
(45) Date of Patent: Oct. 13, 2026

(54) ELECTRONIC DEVICE AND ELECTRONIC DEVICE CONTROL METHOD

(71) Applicant: SAMSUNG ELECTRONICS CO., LTD., Suwon-si (KR)

(72) Inventors: Seongjoo Han, Suwon-si (KR); Jongyoub Ryu, Suwon-si (KR); Woocheol Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 18/763,232

(22) Filed: Jul. 3, 2024

(65) Prior Publication Data

US 2024/0353990 A1 Oct. 24, 2024

Related U.S. Application Data

(63) Continuation of application No. PCT/KR2023/002047, filed on Feb. 13, 2023.

(30) Foreign Application Priority Data

Feb. 18, 2022 (KR) ........................ 10-2022-0021583

(51) Int. Cl.
*G06F 3/04845* (2022.01)
*G06F 3/01* (2006.01)
*G06T 7/62* (2017.01)

(52) U.S. Cl.
CPC .......... *G06F 3/04845* (2013.01); *G06F 3/013* (2013.01); *G06T 7/62* (2017.01)

(58) Field of Classification Search
CPC ........ G06F 3/04845; G06F 3/013; G06T 7/62
(Continued)

(56) References Cited

U.S. PATENT DOCUMENTS 9,244,539 B2 1/2016 Venable et al.
9,690,376 B2 6/2017 Davis et al.
(Continued)

FOREIGN PATENT DOCUMENTS

CN 106227345 A 12/2016
CN 111149134 A 5/2020
(Continued)

OTHER PUBLICATIONS

Lin CJ, Prasetyo YT, Widyaningrum R. Eye movement measures for predicting eye gaze accuracy and symptoms in 2D and 3D displays. Displays. Dec. 1, 2019;60:1-8.*
(Continued)

*Primary Examiner* — Phu K Nguyen
(74) *Attorney, Agent, or Firm* — Sughrue Mion, PLLC

(57) ABSTRACT

An electronic device includes a sensor, a display, and at least one processor configured to control the display to display a virtual reality content corresponding to a virtual reality environment, identify a gaze direction of a user based on data acquired through the sensor, identify a point on the virtual reality environment based on the gaze direction, identify a distance between the user and the identified point in the virtual reality environment, control the display to display a first object at a position corresponding to the identified point in the virtual reality content, identify, based on a user command received while the first object is displayed, whether a virtual object is present within a second object positioned at the identified point in the virtual reality environment, and control the virtual object according to the user command if the virtual object being identified as present.

20 Claims, 15 Drawing Sheets

(58) Field of Classification Search
USPC .......................................................... 345/418
See application file for complete search history.

(56) References Cited

U.S. PATENT DOCUMENTS

| | | | |
|---|---|---|---|
| 10,636,212 | B2 | 4/2020 | Tamaoki et al. |
| 10,661,172 | B2 | 5/2020 | Shao |
| 10,796,487 | B2 | 10/2020 | Crews et al. |
| 10,861,242 | B2 | 12/2020 | Lacey et al. |
| 10,872,438 | B2 | 12/2020 | Hwang |
| 11,573,627 | B2 | 2/2023 | Grzesiak |
| 11,586,281 | B2 | 2/2023 | Ratcliff et al. |
| 2014/0160001 | A1 | 6/2014 | Kinnebrew et al. |
| 2015/0193018 | A1 | 7/2015 | Venable et al. |
| 2016/0284129 | A1* | 9/2016 | Nishizawa .............. G06F 3/013 |
| 2019/0026589 | A1* | 1/2019 | Sugihara ................. G06T 19/20 |
| 2019/0212827 | A1* | 7/2019 | Kin .................... G02B 27/0172 |
| 2019/0362557 | A1* | 11/2019 | Lacey ..................... G06F 3/017 |
| 2019/0371075 | A1 | 12/2019 | Stafford et al. |
| 2020/0233487 | A1* | 7/2020 | Grzesiak ................. G06F 3/011 |
| 2021/0247840 | A1* | 8/2021 | Yoon .................. G02B 27/0093 |
| 2023/0311652 | A1* | 10/2023 | Salter ................... B60N 2/0279 701/36 |
| 2023/0350504 | A1* | 11/2023 | Powderly ................ G06F 1/163 |

FOREIGN PATENT DOCUMENTS

| | | | |
|---|---|---|---|
| CN | 111586395 | A | 8/2020 |
| JP | 2017-58971 | A | 3/2017 |
| JP | 2017-87501 | A | 5/2017 |
| JP | 6731457 | B2 | 7/2020 |
| JP | 2021-524629 | A | 9/2021 |
| KR | 10-2016-0029348 | A | 3/2016 |
| KR | 10-2016-0106629 | A | 9/2016 |
| KR | 10-1691633 | B1 | 1/2017 |
| KR | 10-2019-0085895 | A | 7/2019 |
| KR | 10-2020-0091988 | A | 8/2020 |
| KR | 10-2283747 | B1 | 7/2021 |

OTHER PUBLICATIONS

Yu D, Lu X, Shi R, Liang HN, Dingler T, Velloso E, Goncalves J. Gaze-supported 3d object manipulation in virtual reality. InProceedings of the 2021 CHI Conference on Human Factors in Computing Systems May 6, 2021 (pp. 1-13).*

Ohshima T, Yamamoto H, Tamura H. Gaze-directed adaptive rendering for interacting with virtual space. InProceedings of the IEEE 1996 Virtual Reality Annual International Symposium Mar. 30, 1996 (pp. 103-110). IEEE.*

Lee EC, Heo H, Park KR. The comparative measurements of eyestrain caused by 2D and 3D displays. IEEE Transactions on Consumer Electronics. Oct. 28, 2010;56(3):1677-83.*

International Search Report (PCT/ISA/210) issued on May 1, 2023 by the International Searching Authority in International Application No. PCT/KR2023/002047.

Written Opinion (PCT/ISA/237) issued on May 1, 2023 by the International Searching Authority in International Application No. PCT/KR2023/002047.

Communication issued Jan. 5, 2026 by the Korean Ministry of Intellectual Property in Korean Patent Application No. 10-2022-0021583.

* cited by examiner

ELECTRONIC DEVICE AND ELECTRONIC DEVICE CONTROL METHOD

CROSS-REFERENCE TO RELATED APPLICATIONS

This application is a continuation of International Application No. PCT/KR2023/002047, filed on Feb. 13, 2023, which is based on and claims priority to Korean Patent Application No. 10-2022-0021583, filed on Feb. 18, 2022, in the Korean Intellectual Property Office, the disclosures of which are incorporated by reference herein in their entireties.

BACKGROUND ART

1. Field

The disclosure relates to an electronic device and a control method thereof, and more particularly to an electronic device that provides a virtual reality (VR) image and a control method thereof.

2. Description of the Related Art

Virtual reality (VR) technology may refer to a technology with which virtual reality, which is similar with reality, may be experienced through a simulation implemented with software technology. The VR technology may provide users with various experiences inside the virtual reality. Recently, VR technology, which allows users to experience virtual reality away from reality, has become more popular.

Users may perform interactions with virtual objects within a virtual environment while viewing VR content that is provided through an electronic device. For example, users may control virtual electronic products within the virtual environment with voice commands. However, in this case, an accurate interaction between a user and a virtual object may not be carried out if external noise is introduced. Specifically, information identifying a specific virtual object may not be included in a voice command of the user. the issue may be resolved by preparing a separate device (e.g., an interface device such as a joy stick, etc.) with which an interaction with a virtual object can be identified. However, this is only possible with limited VR content and additional costs may be necessary for providing the separate device.

Accordingly, there is a demand identifying the virtual object in which the user intends to execute an interaction with without a separate device and without a voice command of the user.

SUMMARY

According to an embodiment of the disclosure, an electronic device includes a sensor, a display, and at least one processor configured to control the display to display a virtual reality content corresponding to a virtual reality environment, identify a gaze direction of a user based on data obtained through the sensor, identify a point on the virtual reality environment at which the user is gazing based on the gaze direction, identify a distance between the identified point and the user on the virtual reality environment, control the display to display a first object at a position corresponding to the identified point on the virtual reality content, identify, based on a user command received while the first object is displayed, whether a virtual object is present within a second object which is positioned at the identified point in the virtual reality environment, and control, based on the virtual object being identified as present, the virtual object according to the user command, and at least one of the first object or the second object is determined based on the identified distance.

The at least one processor may be further configured to identify a size of the first object based on the identified distance, control the display to display the first object having the identified size at the position corresponding to the identified point on the virtual reality content, and identify the virtual object within the second object based on the second object having a fixed size.

The size of the first object may be inversely proportional to the identified distance.

The at least one processor may be further configured to identify a number of virtual objects within in the virtual reality environment, in a state in which the number of virtual objects is less than a pre-set value, identify the size of the first object based on the identified distance, and identify a size of the second object as the fixed size.

The at least one processor may be further configured to identify a size of the second object based on the identified distance, control the display to display the first object having a fixed size at the position corresponding to the identified point on the virtual reality content, and identify the virtual object within the second object based on the second object having the identified size.

A size of the second object may be proportional to the identified distance.

The at least one processor may be further configured to identify a number of virtual objects within the virtual reality environment, in a state in which the number of virtual objects is greater than or equal to a pre-set value, identify the size of the first object as the fixed size, and identify the size of the second object based on the identified distance.

The at least one processor may be further configured identify a size of the first object in a fixed size and identify a size of the second object based on the identified distance in a state in which identified distance is less than a pre-set value, and identify the size of the first object based on the identified distance and identify the size of the second object in a fixed size in a state in which the identified distance is greater than or equal to the pre-set value.

According to another embodiment of the disclosure, a method for controlling an electronic device includes displaying a virtual reality content corresponding to a virtual reality environment, identifying a gaze direction of a user based on data obtained through a sensor, identifying a point on the virtual reality environment at which a user is gazing based on the gaze direction, identifying a distance between the identified point and the user on the virtual reality environment, displaying a first object at a position corresponding to the identified point on the virtual reality content, identifying, based on a user command received while the first object is displayed, whether a virtual object is present within a second object positioned at the identified point in the virtual reality environment, and controlling, based on the virtual object being identified as present, the virtual object according to the user command, and at least one of the first object or the second object is determined based on the identified distance.

The identifying the distance between the identified point and the user on the virtual reality environment may include identifying a size of the first object based on the identified distance, the displaying the first object at the position corresponding to the identified point on the virtual reality content may include displaying the first object having the identified size at the position corresponding to the identified point on the virtual reality content, and the identifying whether the virtual object is present within the second object positioned at the identified point in the virtual reality environment may include identifying a virtual object within the second object based on the second object having a fixed size.

The size of the first object may be inversely proportional to the identified distance.

The method may further include identifying a number of virtual objects included in the virtual reality environment, in a state in which the number of virtual objects is less than a pre-set value, identifying the size of the first object based on the identified distance, and identifying a size of the second object as the fixed size.

The identifying the distance between the identified point and the user on the virtual reality environment may include identifying a size of the second object based on the identified distance displaying the first object at the position corresponding to the identified point on the virtual reality content may include displaying the first object having a fixed size at the position corresponding to the identified point on the virtual reality content, and the identifying whether the virtual object is present within the second object positioned at the identified point in the virtual reality environment may include identifying the virtual object included within the second object based on the second object having the identified size.

The size of the second object may be proportional to the identified distance.

The method may further include identifying a number of virtual objects within in the virtual reality environment, in a state in which the number of virtual objects is greater than or equal to a pre-set value, identifying a size of the first object as the fixed size, and identifying the size of the second object based on the identified distance.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Terms used in describing embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," and "may include" are used to designate a presence of a corresponding characteristic (e.g., elements such as numerical value, function, operation, or component), and not to preclude a presence or a possibility of additional characteristics.

The expression at least one of A or B is to be understood as indicating any one of only "A," only "B," or "A and B."

Expressions such as "1st," "2nd," "first" or "second" used in the disclosure may limit various elements regardless of order and/or importance, and may be used merely to distinguish one element from another element and not limit the relevant element.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used herein perform at least one function or operation, and may be implemented with a hardware or software, or implemented with a combination of hardware and software. In addition, a plurality of "modules" or a plurality of "parts," except for a "module" or a "part" which needs to be implemented to a specific hardware, may be integrated in at least one module and implemented as at least one processor.

In the disclosure, the term "user" may refer to a person using an electronic device or a device (e.g., an artificial intelligence electronic device) using an electronic device.

One or more embodiments of the disclosure will be described in greater detail below with reference to the accompanied drawings.

Figure 1:
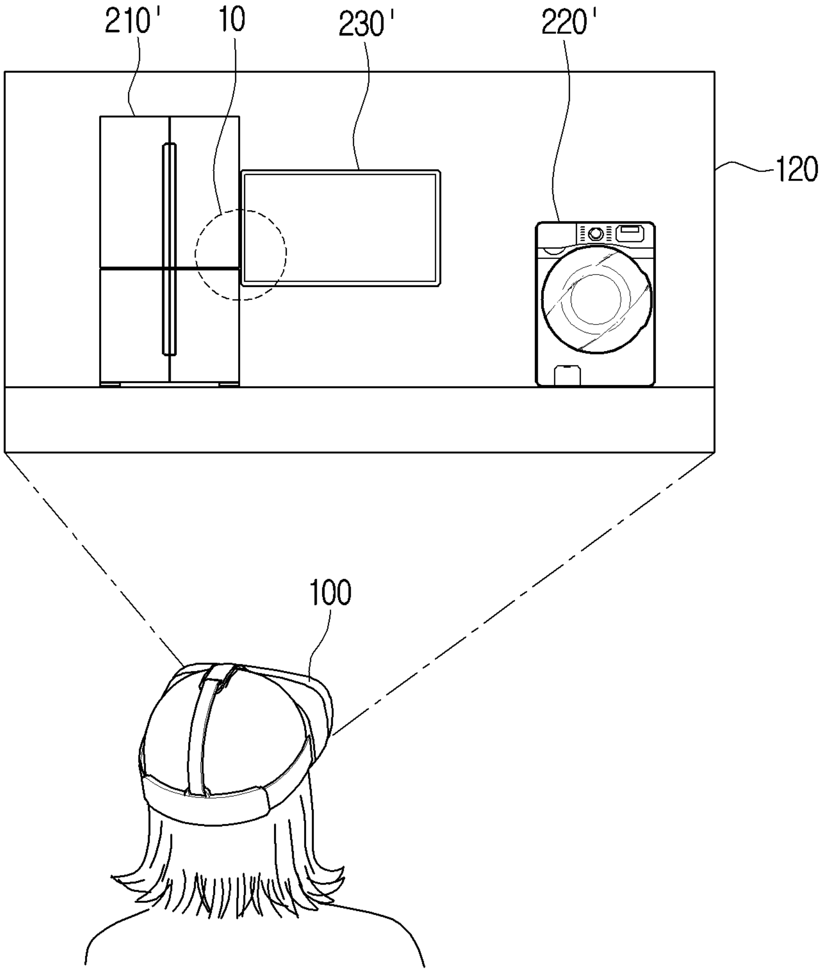
FIG. 1 is a diagram illustrating an electronic device according to one or more embodiments.

FIG. 1 is a diagram illustrating an electronic device according to one or more embodiments.

Referring to FIG. 1, an electronic device 100 may be implemented as a head mounted display (HMD) which is a display device which a user wears on his or her head. However, the above is not limited thereto, and the electronic device 100 may be implemented as a user terminal device, and the like which provides an image mounted to a virtual reality (VR) device. The electronic device 100 may be implemented as a smartphone, a tablet, or the like which provides an image to both eyes of the user by being attached to a front surface of a main body of the VR device having a shape as a pair of glasses, a head set, a helmet, or the like. Specifically, if the electronic device 100 is implemented as a smartphone, the display 120 provided in the smartphone may display an image in close proximity to both eyes of the user, and accordingly, the user may receive an image in front of his or her very eyes. At this time, at a back surface of the main body of the VR device, a band and the like may be formed for the main body of the VR device to be wearable on a head of the user. In addition thereto, at the main body of the VR device, a track pad for operation, a return button, a sound adjustment key, and the like may be mounted.

Meanwhile, the user who uses the electronic device 100 may perform various interactions with a virtual object included in a virtual reality space. Assuming that the virtual object included in the virtual reality space corresponds to the electronic device, the user using the electronic device 100 to control the virtual object, that is, a virtual electronic device corresponds thereto. Specifically, the user may input a voice command for controlling the virtual electronic device to the electronic device 100. Further, the electronic device 100 may control the virtual electronic device of the virtual reality space in response to the received voice command of the user. According to one or more embodiments, referring to FIG. 1, the user may input a voice command for executing an interaction with a virtual object such as a refrigerator 210', a TV 230', and a washer 220' included in a virtual reality content. At this time, the refrigerator 210', the TV 230', and the washer 220' included in a virtual reality content may be two dimensional images corresponding respectively to a refrigerator 210, a TV 230, and a washer 220 included in a three dimensional virtual reality environment. It may be assumed that the user input a voice command of "open refrigerator door" with respect to the refrigerator from among a plurality of virtual objects included in the virtual reality content. At this time, the processor may identify, in response to the input voice command of the user (e.g., open refrigerator door), the refrigerator 210 as the virtual object to perform an interaction with the user in a virtual reality environment 200. Further, the processor may perform an operation of opening a door of the refrigerator in the virtual reality environment. Further, the processor may display an image of the refrigerator 210' with the door opening in a display as the virtual reality content.

Meanwhile, assuming that the user input a voice command of "turn on power", the processor 130 of the electronic device 100 may not easily identify the virtual object for executing an interaction with the user from among the plurality of virtual objects with only a user voice command of "turn on power". This may be because information with which a virtual object can be identified within a user voice is not included. Even if information with which a virtual object can be identified is included in the user voice, the electronic device may not easily identify the virtual object accurately even when external noise is input together at a moment when the user inputs the voice command.

To this end, the electronic device 100 of the disclosure may track a gaze of the user on the virtual reality content 200', and identify the virtual object based on the gaze of the user. At this time, the electronic device 100 of the disclosure may display an object 10 at a position corresponding to a position of the gaze of the user on the virtual reality content 200'. This is for the user to be able to accurately select the virtual object with which to execute and interaction with by accurately informing the user on where the gaze of the user is positioned. Referring back to FIG. 1, the object 10 corresponding to the gaze of the user is displayed between the refrigerator 210' and the TV 230'. At this time, the electronic device 100 may identify as the user having simultaneously gazed at the refrigerator 210' and the TV 230', and if the user inputs the voice command of "turn of power" to the electronic device, the electronic device may perform an interaction of turning-on power of the refrigerator 210' and the TV 230' which are virtual objects on the virtual reality space.

Meanwhile, according to one or more embodiments, a size of an object which corresponds to the gaze of the user taking into consideration a feature of the virtual reality environment 200 may be adjusted. If a plurality of virtual objects are present within the virtual reality environment 200, a plurality of objects may be displayed overlapped with one another in the virtual reality content viewed by the user. Accordingly, if the size of the object corresponding to the gaze of the user is displayed in a fixed size without consideration of the feature of the virtual reality environment 200, the user may not be able to identify the accurate position of the gaze of the user with respect to the plurality of virtual objects which have been overlapped and displayed. To this end, the disclosure describes of adjusting the size of the object 10 corresponding to the gaze of the user taking into consideration the feature of the virtual reality environment 200 and a position of the user and the like on the virtual reality environment 200. One or more embodiments will be described in detail below.

Figure 2:
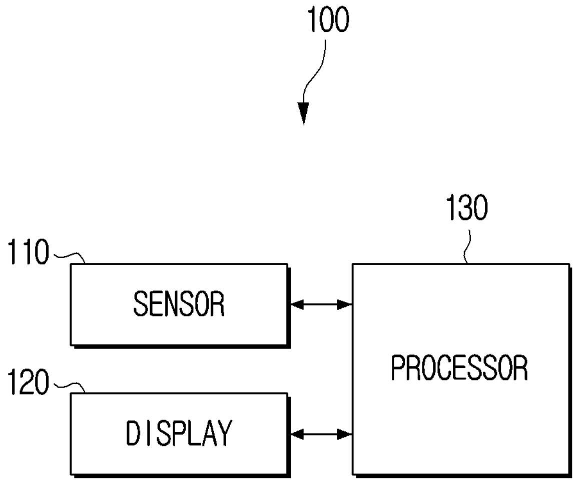
FIG. 2 is a configuration diagram illustrating an electronic device according to one or more embodiments.
Figure 3:
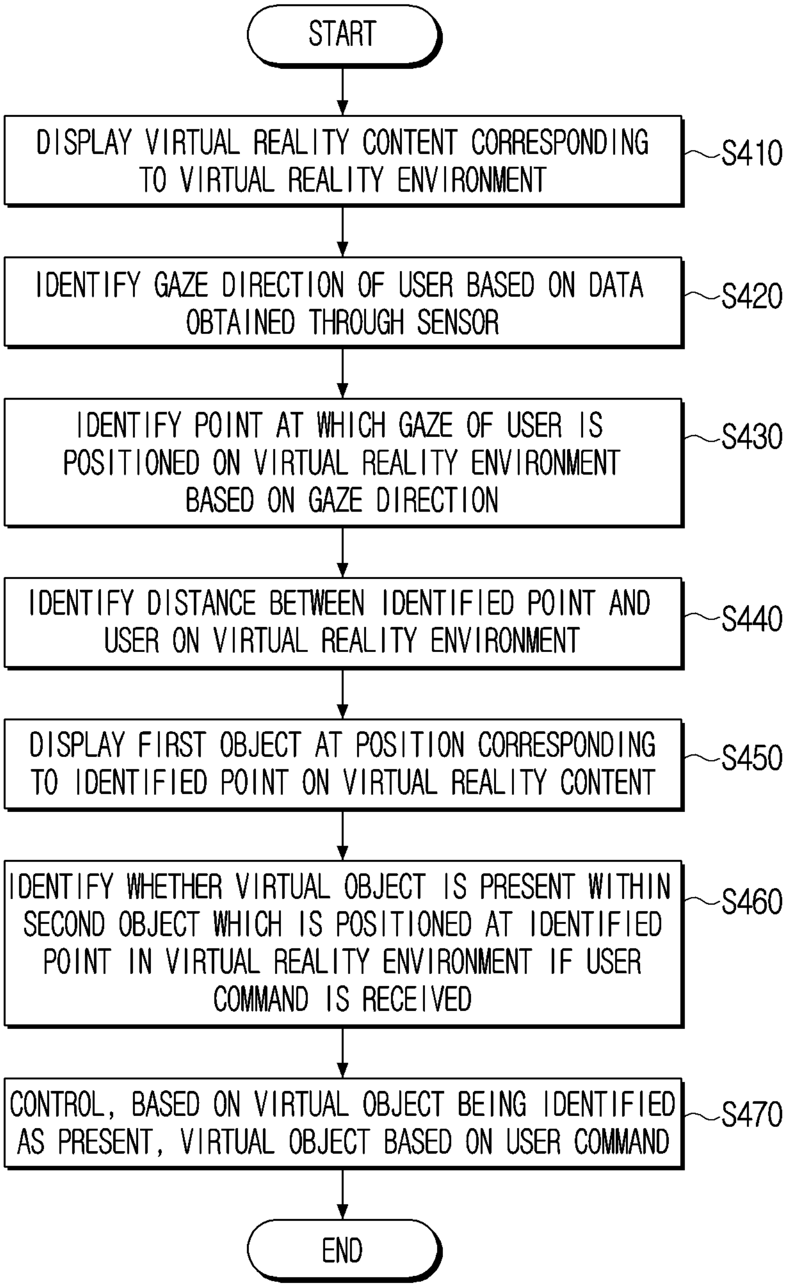
FIG. 3 is a flow chart schematically illustrating a control method of an electronic device according to one or more embodiments.

FIG. 2 is a configuration diagram illustrating an electronic device according to one or more embodiments, and FIG. 3 is a flow chart illustrating schematically a control method of an electronic device according to one or more embodiments.

Referring to FIG. 2, the electronic device 100 according to one or more embodiments includes a sensor 110, the display 120, and the processor 130.

The sensor 110 may sense a movement of the user using the electronic device 100. To this end, the sensor 110 may include at least one from among an acceleration sensor and a gyro sensor. Specifically, the movement of the user using the electronic device may be sensed by the acceleration sensor sensing an acceleration of the electronic device 100, and the gyro sensor sensing an angular velocity of the electronic device 100. Further, the electronic device 100 may identify a gaze direction and the position of the user based on the movement of the user sensed by the sensor.

The display 120 may display various images. Here, an image may be a concept including both a still image and a moving image, and the moving image may be a 2D image as well as a VR image. Specifically, in the case of the VR image, the display 120 may change and display a viewpoint of an image being displayed according to the movement of the user or a viewing direction of the user who used the electronic device 100.

To this end, the display 120 may be implemented in displays of various forms such as, without limitation, a liquid crystal display (LCD) panel, organic light emitting diodes (OLED), a liquid crystal on silicon (LCoS), a digital light processor (DLP), and the like. In addition, in the display 120, a driving circuit, which may be implemented in a form of an a-si TFT, a low temperature poly silicon (LTPS) TFT, an organic TFT (OTFT), or the like, a backlight unit, and the like may be included together therewith. The display 110 may be implemented as a touch screen coupled with a touch sensor, a flexible display, a rollable display, a three-dimensional display (3D display), a display physically coupled with a plurality of display modules, or the like.

The processor 130 may control the overall operation of the electronic device 100. The processor 130 may control hardware or software elements connected to the processor 130 by operating an operating system or an application program, and perform various data processing and computations. In addition, the processor 130 may process commands or data received from at least one from among other elements by loading in a volatile memory, and store various data in a non-volatile memory.

To this end, the processor 130 may be implemented as a generic-purpose processor (e.g., a CPU or an application processor) capable of performing relevant operations by executing a dedicated processor (e.g., an embedded processor) for performing the relevant operation or at least one software program stored in a memory device.

Referring to FIG. 3, the processor 130 may display the virtual reality content 200' corresponding to the virtual reality environment 200 (S410). The virtual reality content 200' may be a two dimensional image of a three dimensional virtual reality environment 200 which is identified as being obtained from a user viewpoint on the three dimensional virtual reality environment 200. Specifically, in a memory of the electronic device 100, information related to the virtual reality environment 200, map data corresponding to the virtual reality environment 200 may be stored. The processor may identify the position of the user in the virtual reality environment 200 based on map data, change the image of the three dimensional virtual reality environment 200 which is identified as visible from the position of the user to a two dimensional image and display in the display 120. At this time, the two dimensional image may correspond to the virtual reality content 200'.

Meanwhile, the virtual reality content 200' may be obtained based on the position, the gaze direction, and the like of the user in the three dimensional virtual reality environment 200. Referring back to FIG. 1, the processor 130 may identify the position of the user in the three dimensional virtual reality environment 200 which includes a plurality of virtual objects 210, 220, and 230 as positioned at a front of the plurality of virtual objects 210, 220, and 230. Further, the processor 130 may identify that the gaze of the user is facing the front of the plurality of virtual objects 210, 220, and 230. Accordingly, the processor 130 may display a two dimensional image obtained from the front with respect to the refrigerator 210, the TV 230, and the washer 220 in the three dimensional virtual reality environment 200 based on the position and gaze direction of the user in the display 120.

Referring back to FIG. 3, according to one or more embodiments, the processor 130 may identify the gaze direction of the user based on data obtained through the sensor 110 (S420). Specifically, the processor 130 may identify, based on acceleration data and angular velocity data obtained through the sensor 110, a movement of the electronic device 100 and an orientation of the electronic device 100. Further, the processor 130 may use a polar coordinate system and identify a direction the electronic device 100 faces based on the movement and orientation of the electronic device 100 within the polar coordinate system. Further, the processor 130 may identify the direction the electronic device 100 faces as the gaze direction of the user. At this time, the polar coordinate system may match with a polar coordinate system on the map data corresponding to the virtual reality environment 200.

Meanwhile, the processor 130 may identify the position of the user in the virtual reality environment 200 based on data obtained through the sensor 110. Specifically, if the user starts use of the electronic device 100, the processor 130 may match a position of the electronic device 100 with initially set coordinate values on the map data corresponding to the virtual reality environment 200. At this time, the processor 130 may identify the position of the electronic device 100 on the map data as the position of the user. Further, the processor 130 may sense a movement of the electronic device 100 based on data obtained through the sensor (such as a GPS sensor, an acceleration sensor, a gyro sensor, etc.), and identify changes in the position of the electronic device 100 and the coordinate values corresponding to the changed positions on the map data based therefrom. According to one or more embodiments, the processor 130 may identify a real-time position of the user using a GPS sensor included in the sensor 110, and identify the position of the user in the virtual reality environment 200 by applying the identified position of the user on the map data.

Meanwhile, the processor 130 may identify movement of both eyes of the user wearing the electronic device 100, and identify the gaze direction of the user based on the identified movement of both eyes. To this end, in the electronic device 100, a sensor, a camera, or the like which identifies the movement of both eyes of the user may be included. The processor 130 may sense the movement of both eyes of the user using the sensor or the camera, and identify the gaze direction of the user within the polar coordinate system based on the sensed movement of both eyes.

Figure 4:
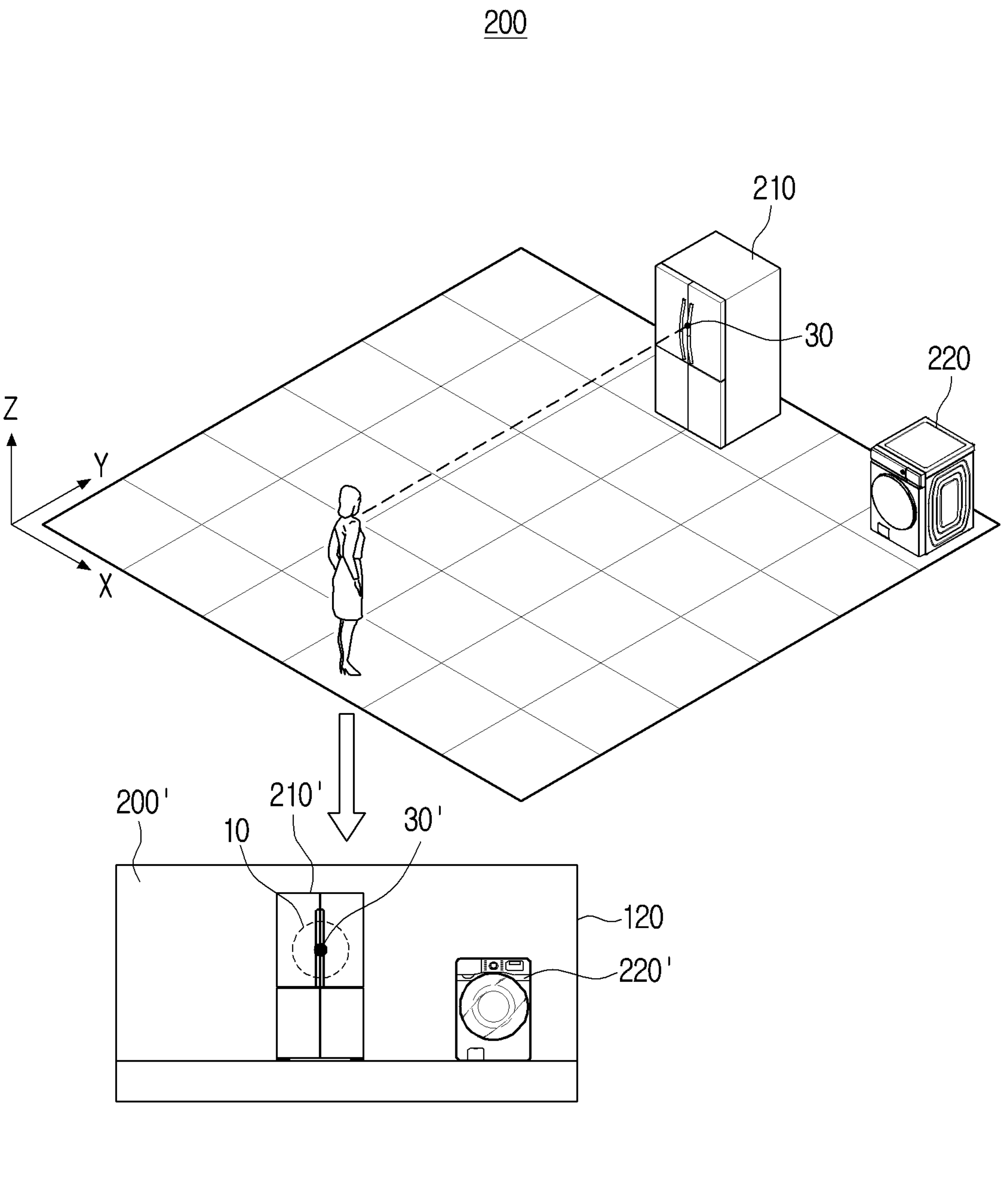
FIG. 4 is a diagram illustrating identifying a point at which a gaze of a user is positioned within a virtual reality environment of the user according to one or more embodiments.

FIG. 4 is a diagram illustrating identifying a point at which a gaze of a user is positioned within a virtual reality environment of the user according to one or more embodiments.

The processor 130 may identify a point 30 at which the gaze of the user is positioned on the virtual reality environment 200 based on the identified gaze direction after having identified the gaze direction of the user (S430). Specifically, referring to FIG. 4, the processor 130 may identify a point 30' at which the gaze of the user is positioned in the virtual reality content 200' which is displayed in the display 120. This may be sensed through the camera included inside of the electronic device 100 as previously described. At this time, the processor 130 may identify the coordinate values corresponding to the point 30' at which the gaze of the user is positioned that is identified on the virtual reality content 200' based on a size and the like of the virtual reality content 200'. According to one or more embodiments, the coordinate values of the point 30' at which the gaze of the user is positioned that is identified on the virtual reality content 200' may be identified as a two dimensional x coordinate value and y coordinate value.

Further, the processor 130 may convert the two dimensional coordinate vales of the point 30' at which the gaze of the user is positioned which is identified on the virtual reality content 200' to three dimensional coordinate values based on the position of the user identified within the virtual reality environment 200. The processor 130 may identify the position of both eyes of the user within the three dimensional virtual reality environment 200 by further identifying a z coordinate value which is identified based on the position of the user in addition to the identified x coordinate value and y coordinate value. Then, after the user extends a straight line corresponding to the gaze of the user from the position of both eyes of the user to the gaze direction, an initial object to which the extended straight line reaches from among a plurality of virtual objects included in the virtual reality environment 200 may be identified. Then, a point at which the straight line extended on the initial object reaches may be identified. That is, the processor 130 may identify the coordinate values of each of the objects, which is based on a position and size of each of the objects, based on the map data corresponding to the virtual reality environment 200, and identify coordinate value of a point at which the straight line corresponding to the gaze of the user and the object meet based therefrom. Accordingly, the processor 130 may identify the point 30 at which the gaze of the user is positioned in the three dimensional virtual reality environment 200.

Referring to FIG. 4, the processor 130 may identify the point 30 at which the gaze of the user is positioned within the virtual reality environment 200 as being positioned at a center of the refrigerator 210 which is a virtual object based on the gaze direction of the user and the position of the user within the virtual reality environment 200.

Meanwhile, according to one or more embodiments, if the plurality of objects are displayed as overlapped in the virtual reality content 200', and the gaze of the user is identified as positioned at an area at which the plurality of objects is overlapped, the processor 130 may identify, from among the plurality of objects, the point 30 at which the gaze of the user is positioned on the virtual reality environment 200 based on an object positioned at the front-most.

Figure 5:
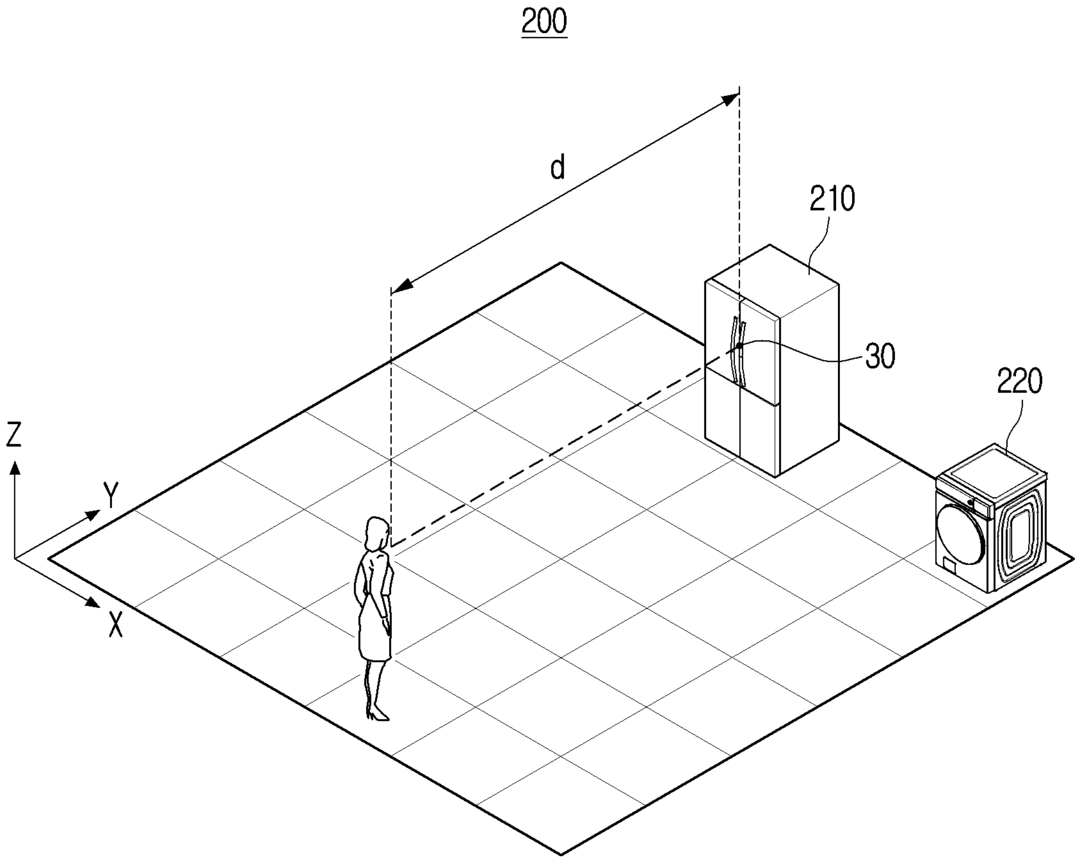
FIG. 5 is a diagram illustrating identifying a distance between a user and a point at which a gaze of the user is positioned in a virtual reality environment according to one or more embodiments.

FIG. 5 is a diagram illustrating identifying a distance between a user and a point at which a gaze of the user is positioned in a virtual reality environment according to one or more embodiments.

Then, the processor 130 may identify a distance between the identified point 30 and the user on the virtual reality environment 200 (S440). Specifically, the processor 130 may identify the distance between the identified point and the user by calculating the distance between the identified point and the user based on a coordinate value corresponding to the position (e.g., the position of the electronic device) at which the gaze of the user is started on the map data and a coordinate value of the point 30 at which the gaze of the user is positioned. According to one or more embodiments, referring to FIG. 5, the processor 130 may identify a distance of the user and the identified point on the virtual reality environment as distance d based on a coordinate value of the position of both eyes of the user which is identified on the map data corresponding to the virtual reality environment and a coordinate value corresponding to the point 30 at which the gaze of the user is positioned that is identified in step S430.

Then, the processor 130 may display a first object 10 at a position corresponding to the identified point on the virtual reality content (S450).

The first object 10 may be generated based on the movement of both eyes of the user viewing the virtual reality content, and may be displayed overlapped on the virtual reality content 200' which is displayed in the display 120 by the processor 130. Through the first object 10, the user may identify the position and direction of the gaze of the user with respect to the virtual reality content 200'. Then, the user may use the first object 10 and select the virtual object included in the virtual reality content 200' with which the user intends to perform an interaction with. That is, the first object 10 may correspond to a user interface (UI) for the virtual reality content.

Figure 6:
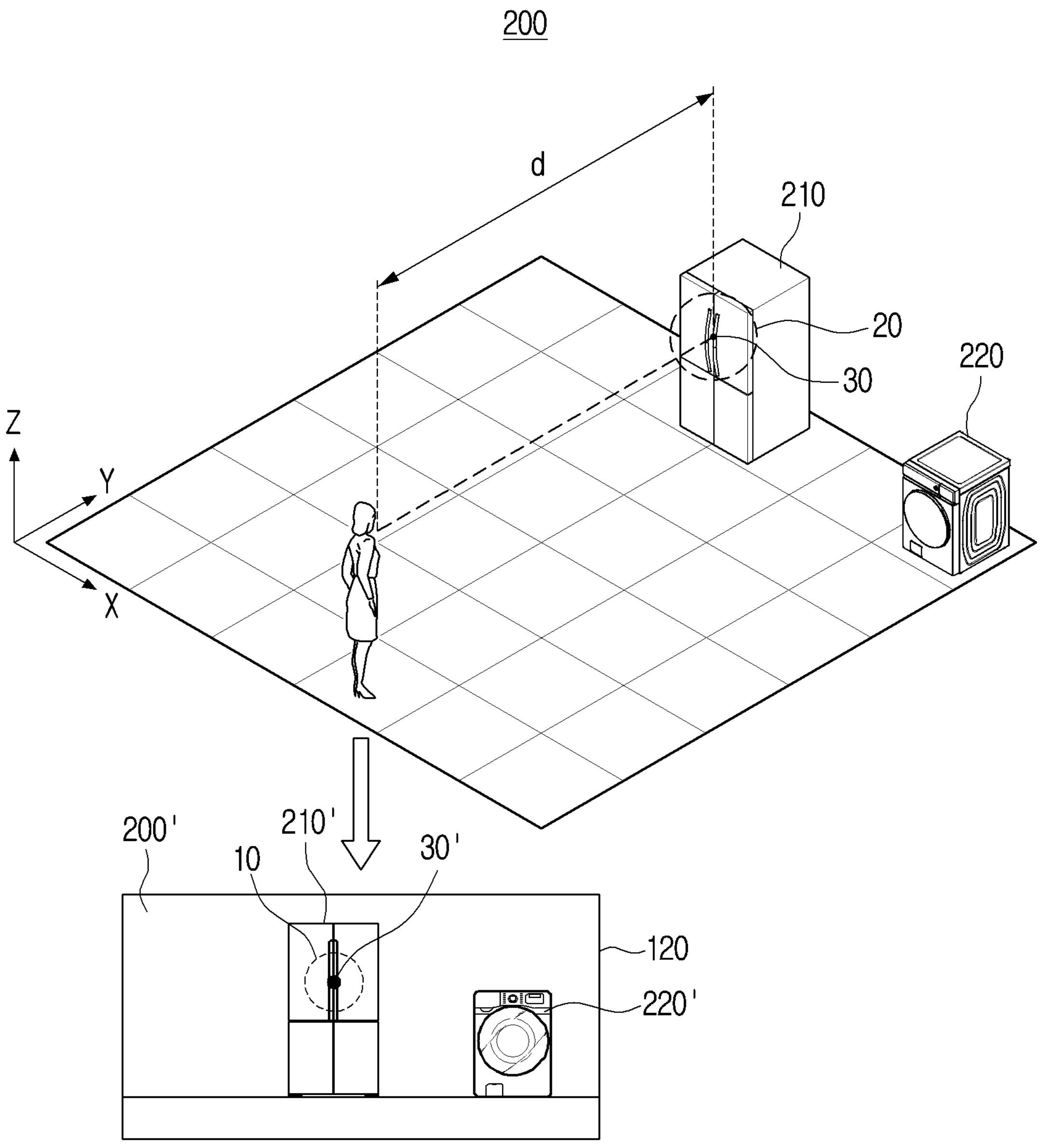
FIG. 6 is a diagram illustrating displaying a first object on a virtual reality content and identifying a second object within a virtual reality environment according to one or more embodiments.

FIG. 6 is a diagram illustrating displaying a first object on a virtual reality content and identifying a second object within a virtual reality environment according to one or more embodiments.

Referring to FIG. 6, the processor 130 may display the first object 10 in a circular form having a pre-set radius based on the point 30 at which the gaze of the user is positioned that is identified on the virtual reality content 200'. In FIG. 6, the gaze of the user is shown as positioned at a center of an upper part of the refrigerator 210' from among the refrigerator 210' and a washer 220', which are virtual objects. Through the above, the user wearing the electronic device 100 may recognize as the gaze of the user being currently positioned at the center of the upper part of the refrigerator 210' within the virtual reality content 200'. Meanwhile, in FIG. 6, the first object 10 has been described as having a circular form, but the first object 10 may be displayed in various shapes such as a triangle or a quadrangle.

In addition, the processor 130 may identify a second object 20 within the virtual reality environment 200 which corresponds to the first object 10. Specifically, the second object 20 may be identified at the point at which the gaze of the user is positioned in the virtual reality environment 200 corresponding to a gaze position of the user identified on the virtual reality content 200'.

The second object 20 may be identified in the virtual reality environment 200 in response to the first object 10, and used in identifying the virtual object with which the user intends to perform an interaction with from among the plurality of virtual objects included in the virtual reality environment 200. More specifically, if the first object 10 provides the user with position information on the gaze of the user and the information is used in the user selecting a virtual object within the three dimensional virtual reality content, the second object 20 may be used when the processor 130 identifies the virtual object selected by the user in the three dimensional virtual reality environment 200.

Meanwhile, as the above is displayed on the virtual reality content 200', unlike the first object 10 which is recognized by the user, the second object 20 may not be recognized by the user because it is identified on the virtual reality environment 200 or the map data corresponding to the virtual reality environment 200.

Referring to FIG. 6, the processor 130 may identify the second object 20 at the point 30 at which the gaze of the user is positioned within the virtual reality environment 200. Specifically, the processor 130 may identify the coordinate values of the point 30 at which the gaze of the user is positioned on three dimensional map data. The above may be identified based on the movement of the user wearing the electronic device 100 or the movement of both eyes of the user obtained through the camera included in the electronic device 100 as previously described. Meanwhile, the processor 130 may identify the second object 20 in a spherical form having a pre-set radius based on the identified coordinate value. In FIG. 6, the second object 20 is shown as having a spherical form, but the second object 20 may also be set in various three dimensional forms such as a cube.

Referring back to FIG. 3, if a user command is received while the first object 10 is displayed, whether the virtual object is present within the second object 20 which is positioned at the identified point 30 in the virtual reality environment 200 may be identified (S460).

Specifically, referring to FIG. 6, the processor 130 may identify, based on receiving a user command through an interface, the virtual object included in the second object 20 having a spherical form within the virtual reality environment 200. To this end, the processor 130 may identify, based on the coordinate vales of the point 30 at which the gaze of the user is positioned on the map data and the pre-set radius of the second object 20, a range of the second object 20 on the map data. Then, the processor 130 may identify whether the virtual object included within the identified range of the second object 20 is present based on the coordinate values, size, and the like of each of the virtual objects which are identified on the map data.

At this time, even if a portion of the virtual object is included in the range of the second object 20, the processor 130 may identify as the virtual object being present within the range of the second object 20. Accordingly, referring to FIG. 6, the processor 130 may identify that the virtual object (e.g., refrigerator) is present within the second object 20 despite only a portion of the refrigerator which is the virtual object being included within the second object 20.

Then, the processor 130 may control, based on the virtual object being identified as present, the virtual object based on the user command (S470). More specifically, the processor 130 may perform a user interaction with respect to the virtual object in the virtual reality environment 200 in response to the user command. According to one or more embodiments, referring to FIG. 6, the user may use the first object 10 and have the gaze of the user to be positioned at the refrigerator 210' on the virtual reality content 200'. Then, the processor 130 may sense the gaze of the user, and identify the point at which the gaze of the user is positioned with the three dimensional virtual reality environment 200. Then, the processor 130 may identify the second object 20 at the identified point, and identify that the refrigerator 210, which is the virtual object, is present in the second object 20. That is, the processor 130 may identify that the virtual object, which is selected through the movement of the gaze of the user, is the refrigerator. Then, the processor 130 may perform the user interaction with the virtual object in the virtual reality environment 200 based on a user input. According to one or more embodiments, if the user inputs a command with respect to the refrigerator, such as a voice command of "open refrigerator door", the processor 130 may control the refrigerator, which is the virtual object, to open the door in response to the voice command of the user within the virtual reality environment 200.

Meanwhile, according to one or more embodiments, the processor 130 may control an operation of an actual external electronic device and not the virtual object. Specifically, the virtual reality environment 200 may be generated by three dimensional modeling of an actual environment. At this time, the virtual object included in the virtual reality environment 200 may be generated matched to each of the electronic devices included in the actual environment, and information on the electronic devices which are matched to each of the virtual objects may be included in the memory. At this time, the processor 130 may identify, based on the user command being received, the electronic device corresponding to the virtual object included in the second object 20, and transmit the user command to the relevant electronic device through a communicator. Is may be assumed that the user input a voice command of "lower refrigerator temperature" while gazing at the refrigerator within the virtual reality environment using the electronic device in a space separated from the actual environment. At this time, the processor 130 may identify that the refrigerator which is a virtual object is included in the second object 20 based on the gaze direction of the user, and transmit a signal corresponding to the voice command of "lower refrigerator temperature" to the refrigerator, which is an external electronic device, through the communicator.

Meanwhile, according to one or more embodiments, at least one from among the first object 10 and the second object 20 may be determined based on an identified distance. That is, the processor 130 may determine at least one from among a size of the first object 10 and a size of the second object 20 based on the identified distance.

Specifically, a display position of the first object 10 and an identification position of the second object 20 may all be identified based on the gaze position of the user, but the size of the first object and the size of the second object 20 from each of the positions may be identified based on the distance between the user and the point 30 at which the gaze of the user is positioned within the virtual reality environment 200.

According to one or more embodiments, while the processor 130 displays an enlarged size of the first object 10 as the distance between the user to the point 30 at which the gaze is positioned increases, the second object 20 may be identified in a fixed size within the virtual reality environment 200. That is, the first object 10 displayed in the virtual reality content may be displayed with the size thereof changed according to the position of the user, but the size of the second object 20 identified within the virtual reality environment 200 may be identified in the fixed size regardless of the position of the user.

Alternatively, different from the above, the processor 130 may identify the first object 10 in the fixed size regardless of the identified distance, and the size of the second object 20 may be identified by enlarging the size of the second object 20 as the distance between the user to the point at which the gaze is positioned decreases. That is, the first object 10 displayed in the virtual reality content may be displayed in the fixed size with only the position adjusted according to the gaze of the user, but the size of the second object 20 identified within the virtual reality environment 200 by the processor 130 may be enlarged and identified as the identified distance decreases.

According to one or more embodiments, adjusting a size of at least one from among the first object 10 and the second object 20 will be described below based on the distance between the user and the point 30 at which the gaze of the user is positioned within the virtual reality environment 200.

Figure 7:
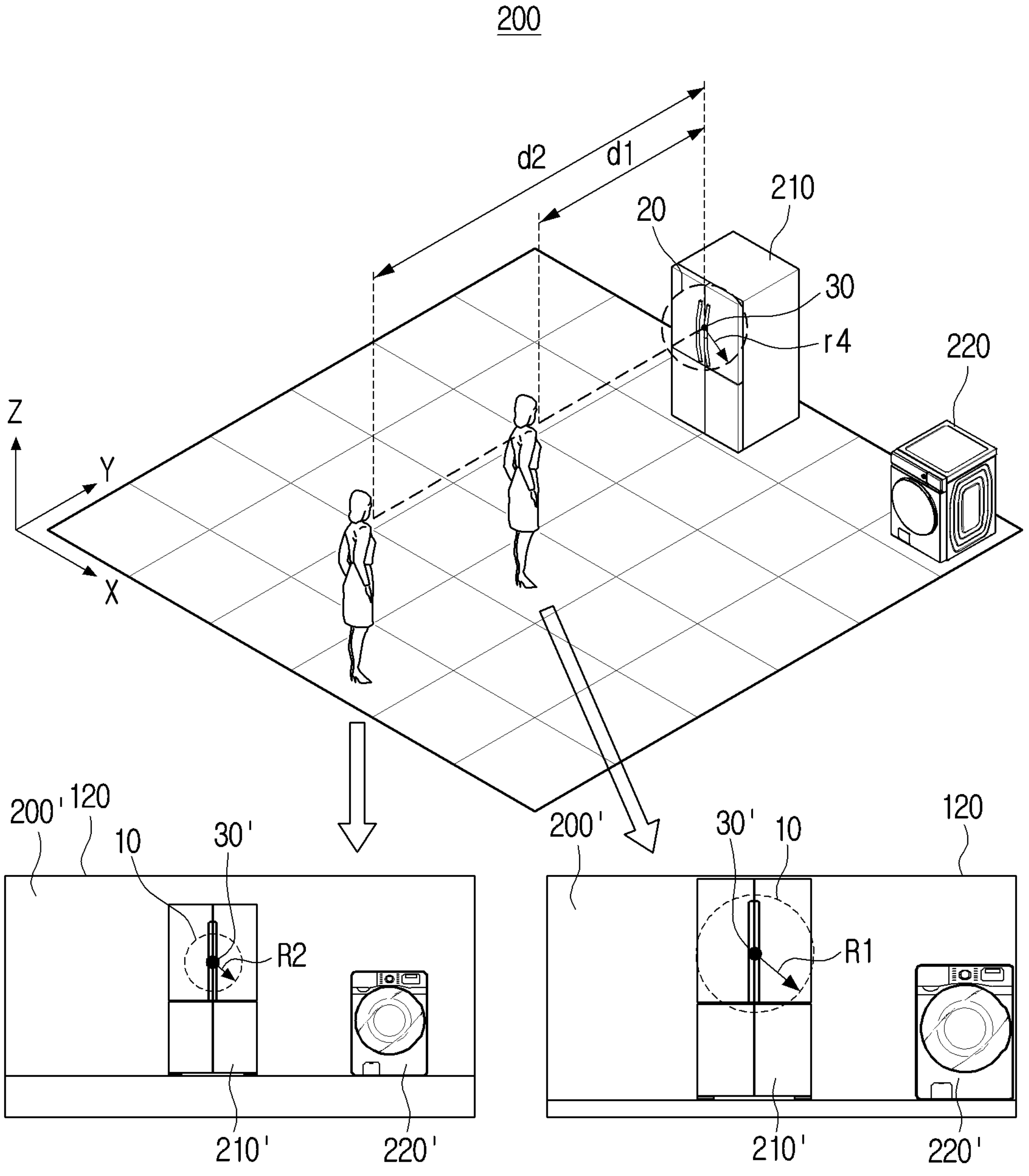
FIG. 7 is a diagram illustrating determining a size of a first object based on an identified distance, and identifying a size of a second object in a fixed size according to one or more embodiments.

FIG. 7 is a diagram illustrating determining a size of a first object based on an identified distance and identifying a size of a second object in a fixed size according to one or more embodiments.

Figure 8:
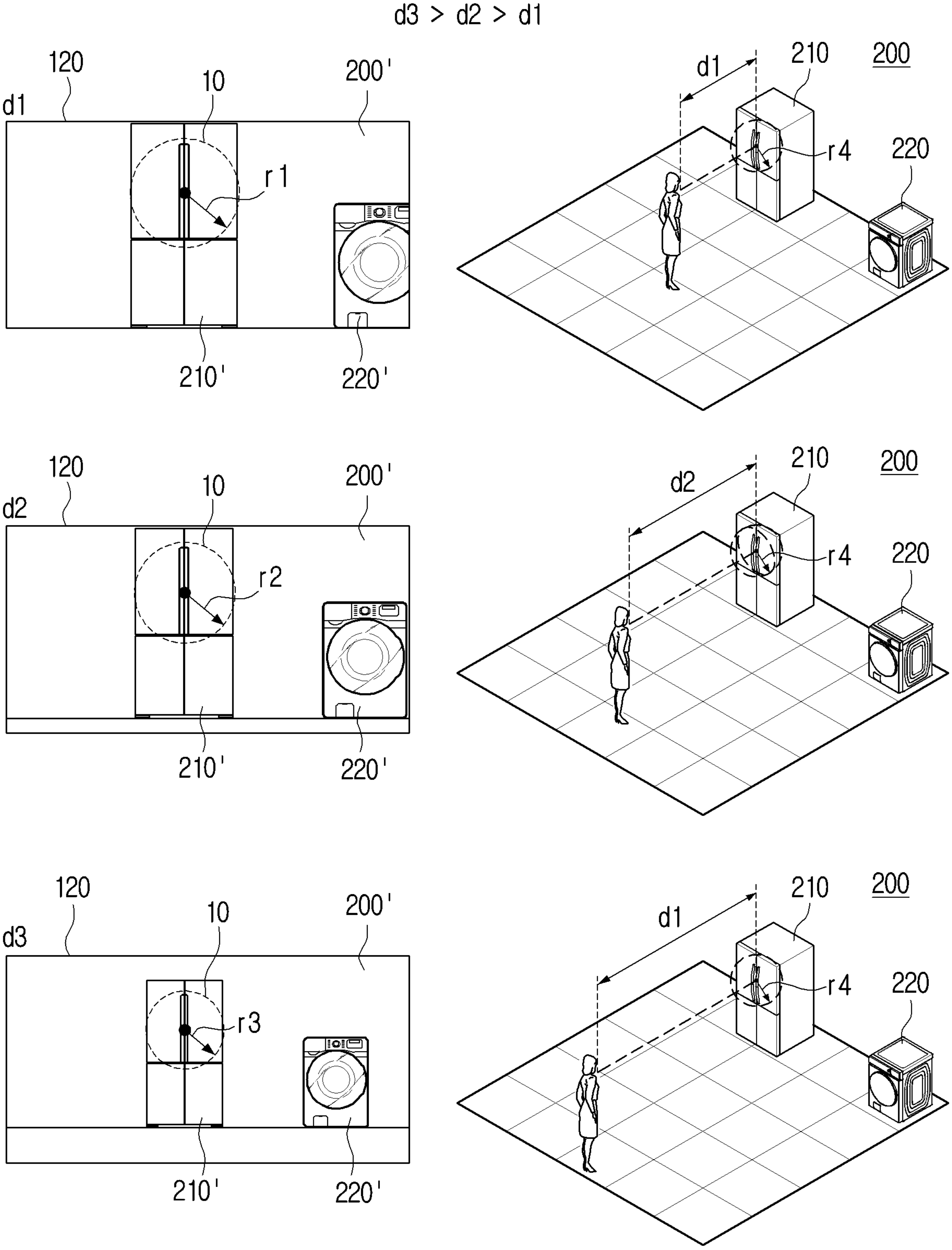
FIG. 8 is a diagram illustrating a size of a first object being changed based on a change in identified distance according to one or more embodiments.

FIG. 8 is a diagram of a size of a first object being changed based on a change in identified distance according to one or more embodiments.

According to one or more embodiments, the processor 130 may identify the size of the first object 10 based on the identified distance, and display the first object 10 having the identified size at a position corresponding to the identified point on the virtual reality content. At this time, the processor 130 may identify whether the virtual object is present within the second object 20 based on the second object 20 having the fixed size.

It may be assumed that a plurality of virtual objects is included within the virtual reality environment 200. At this time, on the virtual reality content which is displayed with two dimensional images, images of the plurality of virtual objects may be displayed overlapped or duplicated. Specifically, if the distance between the user and the point 30 at which the gaze of the user is positioned is far within the virtual reality environment 200, sizes of the images of the plurality of virtual objects which are displayed in the virtual reality content 200' may also become smaller. In this case, if the size of the first object 10 is fixed regardless of the distance, the user may experience difficulty in selecting the virtual object with which to perform an interaction with on the virtual reality content 200'. To this end, the processor 130 may improve user convenience in gaze adjustment with respect to the size adjusted virtual object by also changing the size of the first object 10 in response to the size of the virtual object being changed.

Meanwhile, in this case, the size of the second object 20 which is identified by the processor 130 within the three dimensional virtual reality environment 200 may be fixed. Unlike the size of the virtual object within the virtual reality content being displayed in the display changing according to distance as described above, the size of the virtual object in the three dimensional virtual reality environment 200 which is identified by the processor 130 may not change. Thereby, the processor 130 may accurately identify, even if the second object 20 of the fixed size is used at the identified point after identifying the point 30 at which the gaze of the user is positioned within the virtual reality environment 200, the virtual object which is included in the second object 20 regardless of the change in distance. Accordingly, unlike the first object 10 which is changed in size according to the distance, the processor 130 may identify the second object in the fixed size.

Referring to FIG. 7, the distance between the user and the point 30 at which the gaze of the user is positioned within the virtual reality environment 200 has been increased from d1 to d2. At this time, the sizes of the refrigerator 210', and the washer 220', which are virtual objects, displayed in the display 120 may be reduced. This is because the distance between the user and the virtual object has increased within the virtual reality environment 200. At this time, the processor 130 may reduce the size of the first object 10 in inverse proportion to the increase in the distance between the user and the point 30 at which the gaze of the user is positioned, and display the reduced first object 10 on the display 120. However, even in this case, the size of the second object 20 identified by the processor 130 within the virtual reality environment 200 may be fixed regardless of the distance of the user.

Meanwhile, according to one or more embodiments, the processor 130 may identify the size of the first object 10 to be inversely proportional to the identified distance.

Specifically, because the size of the virtual object within the virtual reality content 200' displayed in the display 120 becomes smaller as the distance between the user and the point 30 at which the gaze of the user is positioned increases, a more precise gaze adjustment is needed with respect to the virtual reality content in order to select the virtual object with which the user intends to execute an interaction with. Accordingly, based on the processor 130 downscaling the size of the first object 10 as the identified distance increases, the user may be able to more precisely adjust the gaze.

Referring to FIG. 8, the distance between the user and the point 30 at which the gaze of the user is positioned within the virtual reality environment 200 may be increased from d1 to d2, and from d2 to d3. At this time, the size of the first object 10 displayed in the display 120 may also be reduced from r1 to r2, and from r2 to r3. Conversely, in the case of the second object 20 identified within the virtual reality environment 200, the processor 130 may identify the second object 20 in the spherical form having a fixed radius of r4 despite the distance between the user and the point 30 at which the gaze of the user is positioned being changed.

Meanwhile, an amount of change in the size of the first object 10 may be set based on an amount of change in distance. According to one or more embodiments, the processor 130 may identify r2 which is a radius of the first object 10 in d2 as a value corresponding to a ratio of d1/d2 of r1. In addition, the processor 130 may identify r3 which is a radius of the first object 10 in d3 as a value corresponding to a ratio of d2/d3 of r2. However, the above is not limited thereto. That is, the amount of change in size or a rate of change in size of the first object 10 may be set differently according to the user or the feature of the virtual reality environment.

Alternatively, the processor 130 may identify the radius (or size) of the first object 10 from each of the distances based on a basic radius (or a basic size) r0 with respect to a pre-set basic distance d0. It may be assumed that a basic distance is 1 m, and a basic radius of the first object 10 is 1 cm. Further, assuming that d1 is 2 m in FIG. 6, the first object 10 displayed in the display 120 may be displayed in the circular form having a radius of 0.5 cm.

Alternatively, the processor 130 may display the first object 10 by generating and displaying the second object 20 having the fixed size on the map data corresponding to the virtual reality environment 200, and displaying, in the display 120, two dimensional images of the virtual object and the second object 20 which are obtained from the distance of the user on the map data. Specifically, the processor 130 may obtain a two dimensional image obtained with respect to the virtual object and a two dimensional image of the second object 20 based on the position of the user within virtual reality environment 200. Then, the processor 130 may display the two dimensional virtual reality content 200' and first object 10 in the display 120 based on the obtained two dimensional images. That is, in this case, the first object 10 may be an image of having converted the second object 20 into the two dimensional image. Referring back to FIG. 8, the virtual reality content 200' displayed in the display 120 may be two dimensional images related to the virtual object and the second object 20 which are identified by the processor 130 to be obtained by the user at distance d1 from the identified point 30 within the virtual reality environment 200. The above is the same even in the case of virtual reality content displayed at d2 and d3.

Meanwhile, it may be assumed that the distance between the user and the point at which the gaze of the user is positioned is quite far within the virtual reality environment 200. At this time, in the display 120, the virtual object may also be displayed in a downscaled size in response to the increased distance. If, the first object 10 is also displayed in the downscaled size like the virtual object, the user may experience difficulty in controlling a field of view. If the first object 10 in the downscaled size and the virtual object in the downscaled size are simultaneously displayed, the user may not accurately identify the first object 10 clearly, and specifically, the user may experience difficulty in accurately positioning the gaze of the user and the first object 10 corresponding to the gaze of the user at the virtual object.

In addition to the above, at this time, the position of the second object may be greatly changed different from the position of the first object within the virtual reality environment 200 by small movements of both eyes of the user or the head of the user wearing the electronic device 100. Accordingly, the virtual object included in the range of the second object 20 identified by the processor 130 may also be changed. This leads to a result of identifying another virtual object other than the virtual object with which the user intends to execute an interaction with.

Figure 9:
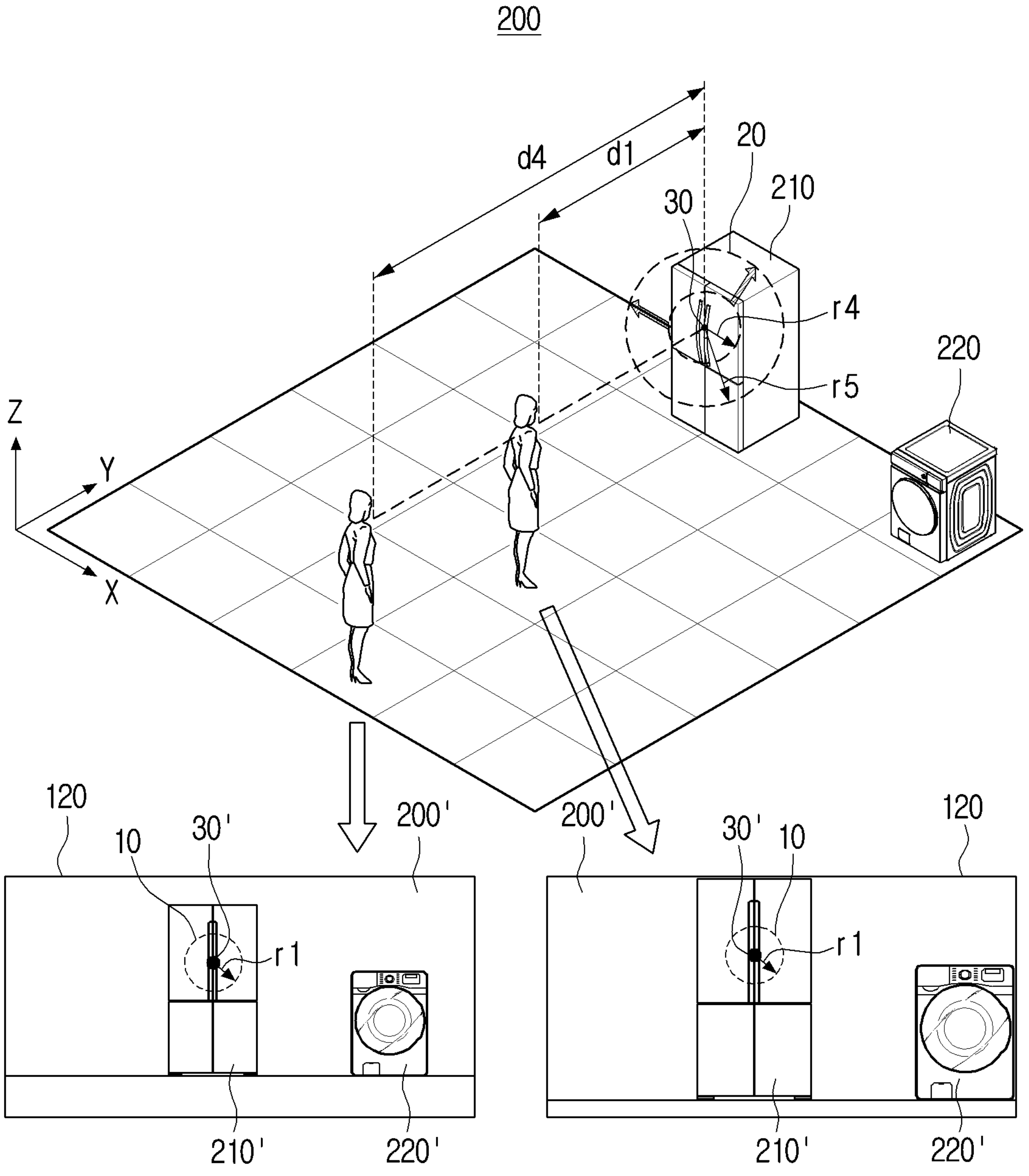
FIG. 9 is a diagram illustrating determining a size of a second object based on an identified distance and identifying a size of a first object to a fixed size according to one or more embodiments.

FIG. 9 is a diagram illustrating determining a size of a second object based on an identified distance and identifying a size of a first object to a fixed size according to one or more embodiments.

Figure 10:
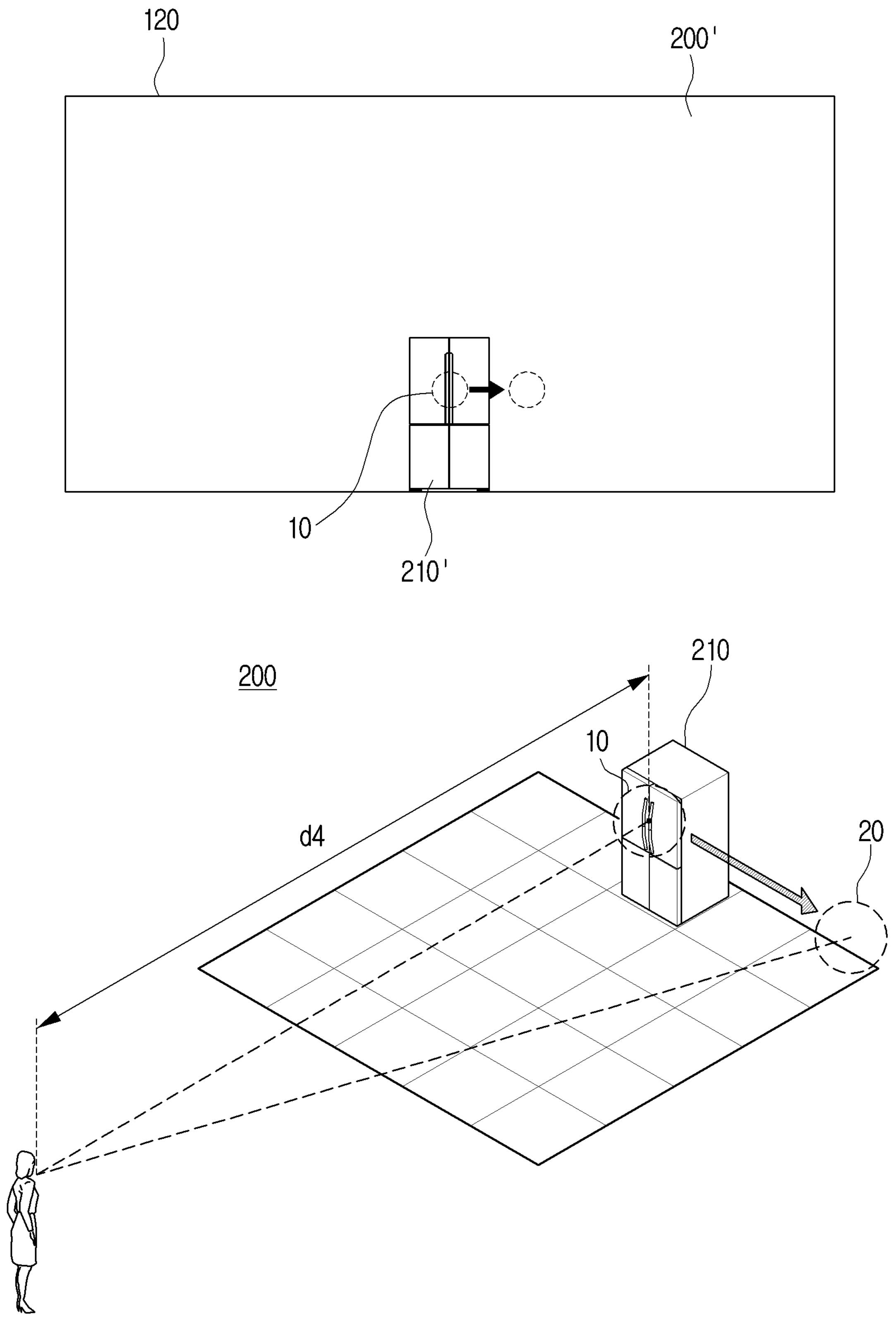
FIG. 10 is a diagram illustrating positions of a first object and a second object changing according to position changes in a gaze of a user on a virtual reality content according to one or more embodiments.

FIG. 10 is a diagram illustrating positions of a first object and a second object changing according to position changes in a gaze of a user on a virtual reality content.

Figure 11:
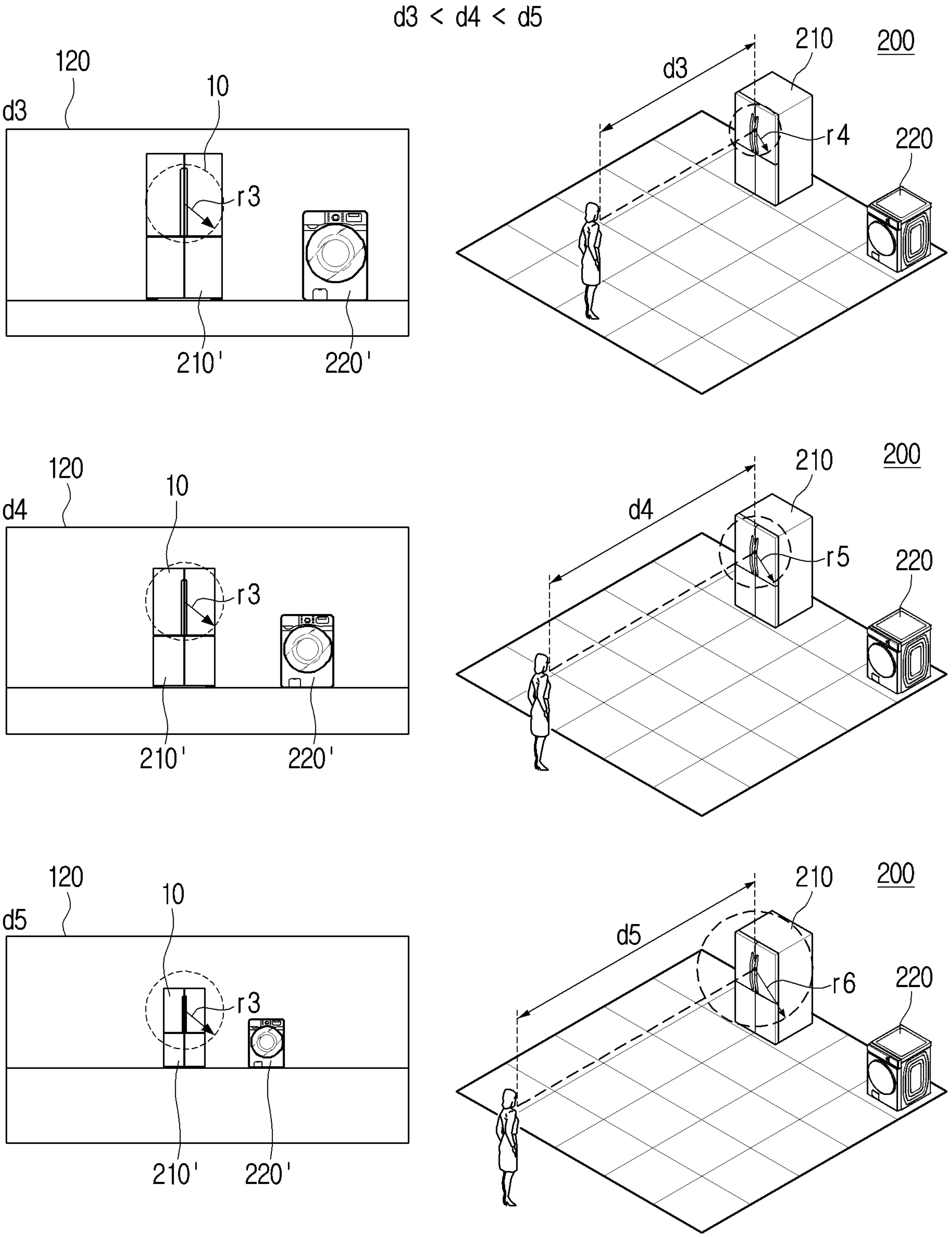
FIG. 11 is diagram illustrating a size of a second object being changed based on a change in identified distance according to one or more embodiments.

FIG. 11 is a diagram illustrating a size of a second object being changed based on a change in identified distance according to one or more embodiments.

To this end, according to one or more embodiments, the processor 130 may identify the size of the second object 20 based on the identified distance, and display the first object 10 having the fixed size at a position corresponding to the identified point on the virtual reality content 200'. At this time, the processor 130 may identify the virtual object included within the second object 20 based on the second object 20 having the identified size.

Specifically, the processor 130 may set the size of the first object 10 which is displayed overlapped at the virtual content in the display 120 to a fixed value. According to one or more embodiments, the processor 130 may set the size of the first object 10 to a pre-set size or a pre-set pixel size. Then, the processor 130 may identify the distance between the user and the point at which the gaze of the user is positioned within the virtual reality environment 200, and set the size of the second object 20 based on the identified distance. Then, the processor 130 may generate and identify the second object 20 having the set size at the point at which the gaze of the user is positioned.

Referring to FIG. 9, the distance between the user and the point 30 at which the gaze of the user is positioned has been increased from d1 to d4 within the virtual reality environment 200. At this time, the sizes of the refrigerator 210' and the washer 220', which are virtual objects', displayed in the display 120 may be reduced. This is because the distance between the user and the virtual objects 210 and 220 has increased within the virtual reality environment 200. At this time, the processor 130 may not change the size of the first object 10 unlike having displayed the refrigerator 210' and the washer 220' in the downscaled sizes, respectively. That is, the processor 130 may display the first object 10 in the circular form having a fixed radius of r1 in the display 120. Conversely, the processor 130 may adjust the size of the second object 20 identified in the virtual reality environment 200 according to the distance. Specifically, if the distance between the user and the point 30 at which the gaze of the user is positioned is d1, the radius of the second object 20 may be r4. However, if the distance between the user and the point 30 at which the gaze of the user is positioned is changed to d4, the processor may identify by increasing the radius of the second object 20 to r5. Through the above, the processor 130 may have the user accurately identify the position of the gaze of the user with respect to the downscaled size virtual object.

Meanwhile, according to one or more embodiments, the processor 130 may identify the size of the second object 20 to be proportional to the identified distance.

It may be assumed that a number of virtual objects within the virtual reality environment 200 is small, and the distance between the user and the point 30 at which the gaze of the user is positioned is far. At this time, the position of the second object 20 within the virtual reality environment 200 may be greatly changed by a small movement of the user using the electronic device 100. Based on the above, the processor 130 may identify the virtual object with which the user intends to execute an interaction with differently due to an unintended movement by the user, or may not identify the virtual object.

According to one or more embodiments, referring to FIG. 10, it may be assumed that one virtual object 210 (e.g., refrigerator) is present within the virtual reality environment 200 and the distance between the user and the point at which the gaze of the user is positioned is quite far. That is, it may be assumed that d4 has quite a large value. At this time, the processor 130 may identify that the point 30 at which the gaze of the user is positioned within the virtual reality environment 200 is greatly changed at even a minute movement of the gaze of the user on the display 120. Based on the above, the processor 130 may ultimately identify that the position of the second object 20 which is identified based on the point 30 at which the gaze of the user is positioned within the virtual reality environment 200 has also greatly changed. In this case, if the second object 20 is the fixed size regardless of the distance, it may lead to a result of the processor 130 identifying that the virtual object included in the second object 20 at the changed position is not present. If the size of the second object 20 increases in proportion to the distance, the processor 130 may identify as the virtual object, that is, the refrigerator 210 being included within the range of the second object 20.

Referring to FIG. 11, the distance between the user and the point 30 at which the gaze of the user is positioned within the virtual reality environment 200 may be increased from d3 to d4, and from d4 to d5. At this time, the radius of the second object 20 in the spherical form identified by the processor 130 within the virtual reality environment 200 may also be increased from r4 to r5, and from r5 to r6. Conversely, in the case of the first object 10 displayed in the display 120, the processor 130 may identify as having the circular form with a fixed radius of r3 despite the distance between the user and the point 30 at which the gaze of the user is positioned being changed.

At this time, the amount of change in the size of the second object 20 may be set based on the amount of change in distance. According to one or more embodiments, the processor 130 may identify the radius of the second object in d4, that is, r5 as a value corresponding to a ratio of d4/d3 in r3. In addition, the processor 130 may identify the radius of the second object in d5, that is, r6 as a value corresponding to a ratio of d5/d3 in r3 or a ratio of d5/d4 in r5. However, the above is not limited thereto.

The processor 130 may identify the radius (or size) of the second object 20 at each of the distances based on a basic radius (or a basic size) r0 with respect to a pre-set basic distance do. According to one or more embodiments, it may be assumed that the basic distance is 2 m, and the basic radius of the second object 20 is 1 m. Further, in FIG. 6, assuming that d3 is 3 m, the processor 130 may identify the second object 20 in the spherical form having a radius of 1.5 m within the virtual reality environment 200.

Alternatively, the processor 130 may identify the size of the second object 20 within the virtual reality environment 200 based more on a width of the first object 10 or a pixel range displayed in the display 120 together with the distance between the user and the point at which the gaze of the user is positioned. More specifically, the processor 130 may display the first object 10 having a pre-set pixel range (or having a fixed size) on the display 120. Then, the processor 130 may identify the distance between the user and the point 30 at which the gaze of the user is positioned in the virtual reality environment 200. Then, the processor 130 may increase and identify the pixel range in response to the increased distance based on the identified distance increasing, and identify the size of the second object 20 based on the increased pixel range.

Meanwhile, the processor 130 may select any one from among the above-described methods of selectively adjusting the first object 10 and the second object 20 considering the number of virtual objects included in the virtual reality environment 200, the identified position of the user in the virtual reality environment 200, and the like. A method of adjusting the first object 10 and fixing the second object 20 according to the identified distance may be referred to as a first method, and a method of fixing the first object 10, and adjusting the second object 20 according to the identified distance may be referred to as a second method for convenience of description below.

First, according to one or more embodiments, the processor 130 may identify a number of objects included in the virtual reality environment 200, identify, based on the number of virtual objects being less than a pre-set number, the size of the first object 10 based on the identified distance, identify the size of the second object 20 in a fixed size, identify, based on the number of virtual objects being greater than or equal to the pre-set number, the size of the first object 10 in the fixed size, and identify the size of the second object 20 based on the identified distance. That is, the processor 130 may selectively apply, based on the number of virtual objects, a method of displaying or identifying the first object 10 and the second object, that is, the first method and the second method.

Figure 12:
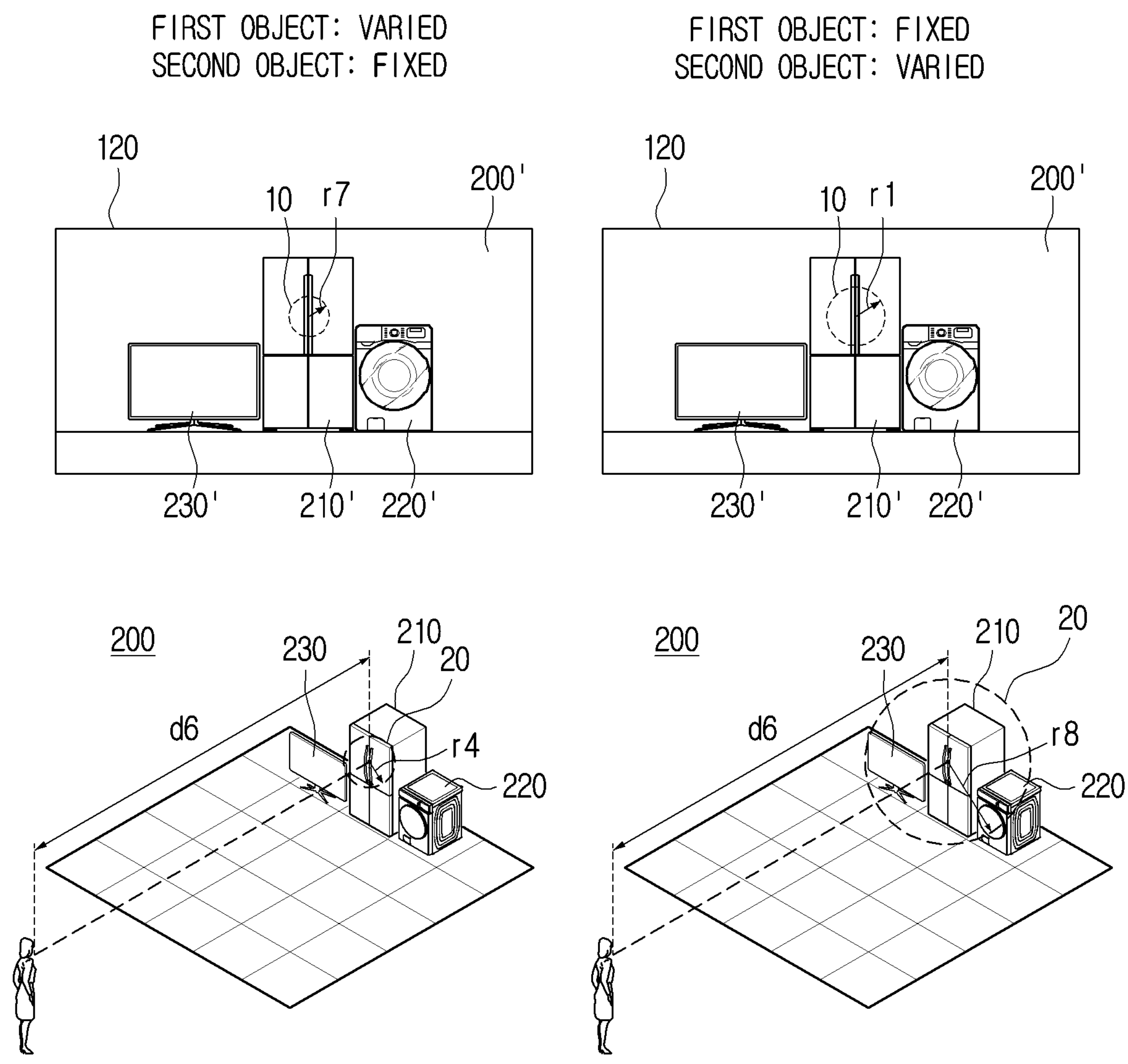
FIG. 12 is a diagram illustrating a comparison of a size of a first object and a size of a second object according to a first method and a second method when a plurality of objects is present within a virtual reality environment according to one or more embodiments.

FIG. 12 is a diagram comparing a size of a first object and a size of a second object according to a first method and a second method when a plurality of objects is present within a virtual reality environment according to one or more embodiments.

Referring to FIG. 12, it may be assumed that there are three virtual objects 210, 220, and 230 present within the virtual reality environment 200, and a spacing distance within the virtual reality environment 200 between each of the virtual objects is small.

At this time, in the case of the first method which fixes the size of the second object 20 regardless of the distance between the user and the point at which the gaze of the user is positioned, the processor 130 may identify the second object 20 in a fixed size r4 regardless of a distance d6 between the user and the point at which the gaze of the user is positioned. Then, the processor 130 may identify the size of the first object 10, that is, the radius of the first object 10 in the circular form as r7 which is inversely proportional to the distance d6 between the user and the point at which the gaze of the user is positioned. At this time, the processor 130 may accurately identify the refrigerator 210' at which the gaze of the user is positioned on the virtual reality content 200' as the virtual object included in the range of the second object 20 in the virtual reality environment 200.

Meanwhile, in the case of the second method which fixes the size of the first object 10 regardless of the distance between the user and the point 30 at which the gaze of the user is positioned, the processor 130 may identify the size of the second object 20, that is, the radius of the second object 20 in the spherical form as r8 which is proportional to the distance d6 between the user and the point at which the gaze of the user is positioned. At this time, despite the user positioning the gaze at the refrigerator 210' for an interaction with the refrigerator 210' on the virtual reality content, the processor 130 may identify virtual objects such as a TV 230 and the washer 220 being included within the range of the second object 20 in addition to the refrigerator 210. That is, a problem of the processor 130 identifying other virtual objects in addition to the virtual object intended by the user as a target of control may occur. Accordingly, the processor 130 may accurately identify the virtual object with which the user intended an interaction with by using the second object 20 of the fixed size regardless of the distance.

Meanwhile, according to one or more embodiments, the processor 130 may identify, based on the identified distance being less than a pre-set distance, the size of the first object 10 based on the identified distance, identify the size of the second distance 20 in the fixed size, identify, based on the identified distance being greater than or equal to the pre-set distance, the size of the first object 10 in the fixed size, and identify the size of the second object 20 based on the identified distance.

Figure 13:
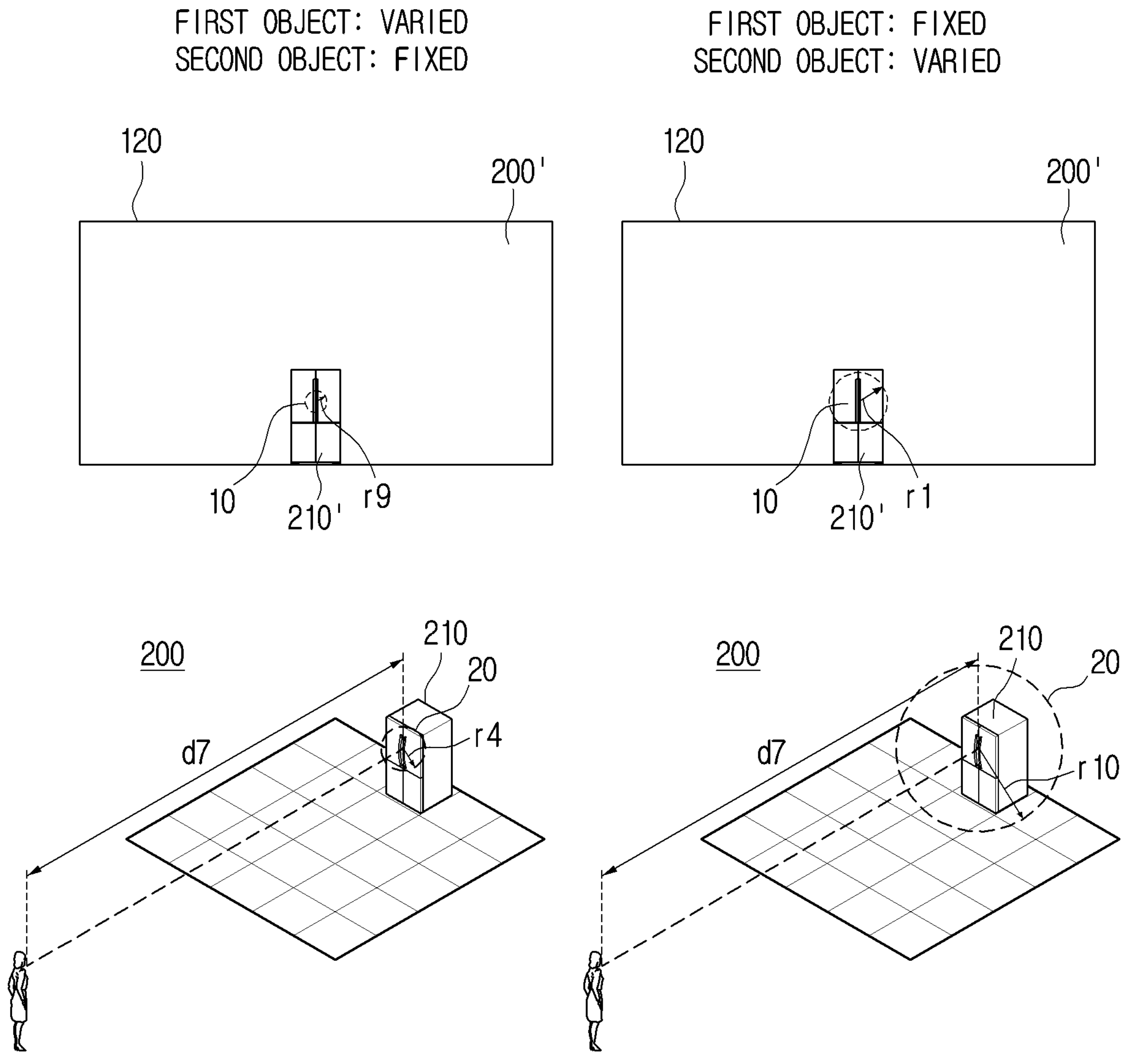
FIG. 13 is a diagram illustrating a comparison of a first method and a second method based on an identified distance of a user according to one or more embodiments.

FIG. 13 is a diagram comparing a first method and a second method based on an identified distance of a user according to one or more embodiments.

Referring to FIG. 13, the distance between the user and the point 30 at which the gaze of the user is positioned is shown as d7. At this time, assuming that d7 has a high value (e.g., assuming that the distance between the user and the point 30 at which the gaze of the user is positioned is far), the processor 130 may display a two dimensional image of the refrigerator 210' which is a virtual object within the virtual reality environment 200 in the display 120 in a downscaled form. At this time, if the processor 130 displays the first object 10 and the second object 20 by the above-described first method, the size of the first object 10 displayed in the display 120 may be very small by being inversely proportional to the distance between the user and the point 30 at which the gaze of the user is positioned. In this case, the first object 10 displayed in the display 120 may have large movements despite small movements of the user wearing the electronic device 100, and accordingly, the user may experience difficulty in selecting a specific object using the first object 10 on the virtual reality content.

Conversely, if the processor 130 displays the first object 10 and the second object 20 by the above-described second method, the processor 130 may display the first object 10 in the display 120 in the fixed size regardless of the distance between the user and the point 30 at which the gaze of the user is positioned. Accordingly, the user may more easily select the virtual object positioned at a farther distance than the first method and accurately control the same. Specifically, in the case of the second method, because the size of the second object 20 used to identify an object within the virtual reality environment 200 becomes larger in proportion to the distance between the user and the point 30 at which the gaze of the user is positioned, the processor 130 may be able to accurately identify the virtual object at which the gaze of the user is positioned.

Accordingly, the processor 130 may identify the first object 10 and the second object 20 based on first method when the distance between the user and the point 30 at which the gaze of the user is positioned is less than a pre-set distance (hereinafter, a first distance), and identify the first object 10 and the second object 20 based on the second method when the pre-set distance is greater than or equal to the pre-set distance.

Meanwhile, the pre-set distance may be set by the user, or set by the processor 130 based on an average movement of the user wearing the electronic device 100. According to one or more embodiments, based on a sensing value obtained through the sensor 110 of the electronic device 100, an acceleration and/or an angular velocity of the user for a pre-set time may be identified, and a degree of average movement of the user may be identified. Further, based on the identified average movement, the processor 130 may set a threshold distance which is changed from the first method to the second method.

Meanwhile, the processor 130 may adjust, based on the distance between the user and the point 30 at which the gaze of the user is positioned, a rate of change in the size of the first object 10 or the second object 20. This is to remedy a disadvantage of the first method or the second method.

According to one or more embodiments, the processor 130 may display the first object according to the second method (a method of identifying the size of the first object in the fixed size, and determining the size of the second object based on the identified distance), and when identifying the second object, change the rate of change and the amount of change in the size of the second object 20 if the identified distance is greater than or equal to a pre-set distance (hereinafter, a second distance).

More specifically, if the distance between the user and the identified distance continues to increase, the size of the second object 20 may also increase in proportion to thereof. At this time, if the size of the second object 20 becomes excessively large, it may lead to a problem of a virtual object not intended by the user being included in the range of the second object 20. Accordingly, the processor 130 may adjust, based on the identified distance being less than the pre-set distance (second distance), the size of the second object 20 based on a first ratio, and adjust, based on the identified distance being greater than or equal to the pre-set distance (second distance), the size of the second object based on a second ratio. At this time, the second ratio may be set to a value smaller than the first ratio.

Meanwhile, according to one or more embodiments, the second distance may be set to a greater value than the above-described first distance. That is, the processor 130 may identify the first object 10 and the second object 20 based on the first method when the distance is less than the first distance, determine the size of the second object 20 with the first ratio but based on the second method when the distance is greater than or equal to the first distance and less than the second distance, and determine the size of the second object 20 with the second ratio but based on the second method when the distance is greater than or equal to the second distance.

As described above, if a plurality of virtual objects are present within the virtual reality environment 200, the first method rather than the second method may be advantageous. However, as the size of the first object 10 becomes smaller as a distance between the user and the virtual object increases, the user may experience an inconvenience in controlling the gaze precisely.

To this end, according to one or more embodiments, the processor 130 may adjust, based on the number of virtual objects within the virtual reality environment 200 being greater than or equal to a pre-set number, and the distance between the user and the point 30 at which the gaze of the user is positioned being less than a pre-set distance (hereinafter, a third distance), the size of the first object 10 based on a third ratio, and adjust, based on the distance between the user and the point 30 at which the gaze of the user is positioned being greater than or equal to the pre-set distance, the size of the first object 10 based on a fourth ratio. At this time, the size of the second object 20 may be fixed. At this time, the third ratio may be a value greater than the fourth ratio.

Figure 14:
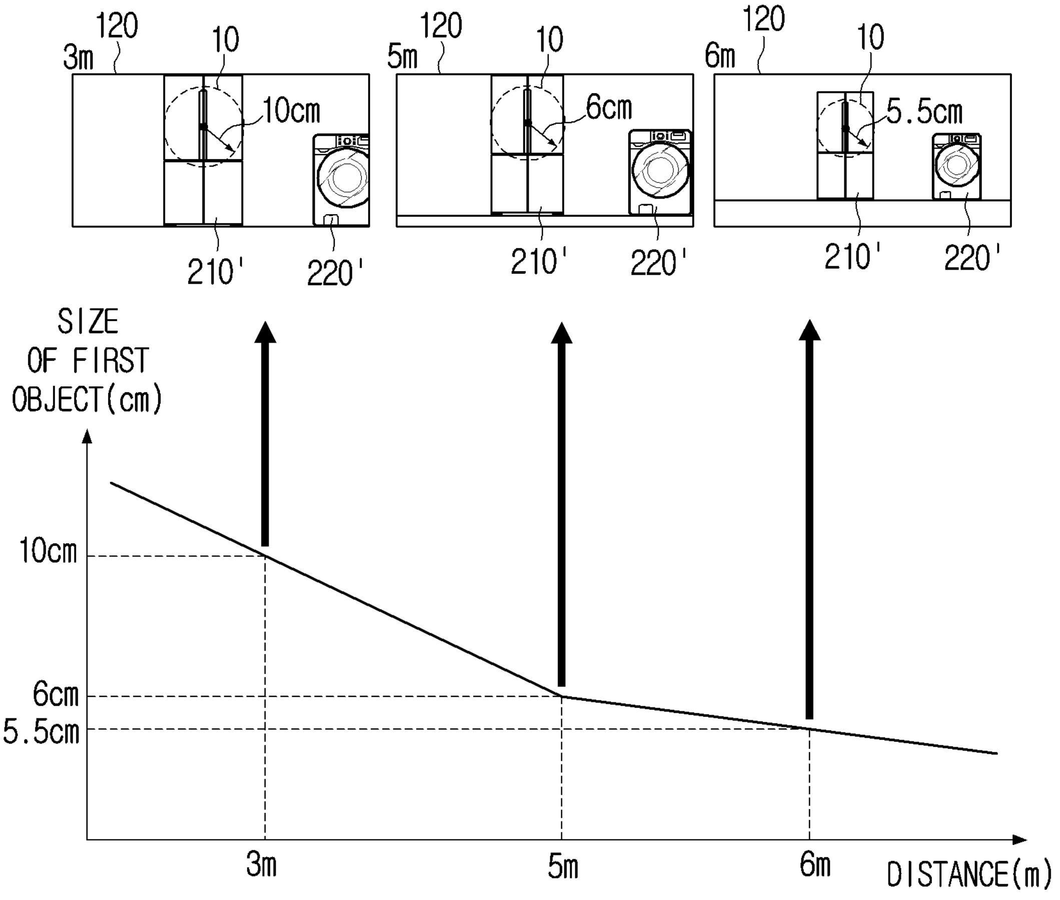
FIG. 14 is a diagram illustrating applying different size change ratios of a first object based on an identified distance of a user according to one or more embodiments.

Referring to FIG. 14, it may be assumed that the pre-set distance is 5 m. At this time, if the distance between the user and the point 30 at which the gaze of the user is positioned is changed from 3 m to 5 m, the radius of the first object 10 may be reduced from 10 cm to 6 cm (10 cm*$\frac{3}{5}$). Meanwhile, if the distance between the user and the point 30 at which the gaze of the user is positioned is changed from 5 m to 6 m, the first object 10 may be changed from 6 cm to 5.5 cm (6 cm*$\frac{5}{6}$*1.1). That is, the processor 130 may adjust a reduction ratio in size of the first object 10 by a factor of 1.1, which is a weight value to the rate of change in distance when the distance is greater than or equal to the pre-set distance.

Meanwhile, according to one or more embodiments, the processor 130 may simultaneously change the sizes of the first object 10 and the second object 20 based on the identified distance. More specifically, the processor 130 may determine the size of the second object 20 according to a fifth ratio and based on the identified distance, and determine the size of the first object 10 according to a sixth ratio and based on the identified distance. At this time, if the distance between the user and the point at which the gaze of the user is positioned increases, the size of the second object 20 may be determined to increase to the fifth ratio, and the size of the first object 10 may be determined to decrease to the sixth ratio. Through the above, based on the distance between the user and the point at which the gaze of the user is positioned increasing, the processor 130 may reduce the size of the first object 10 and display the same in response to the size of the virtual object which is displayed in the virtual reality content being decreased. However, unlike the first object 10, the processor 130 may accurately identify the virtual object selected by the user within the virtual reality environment according to the size of the second object 20 being increased.

Figure 15:
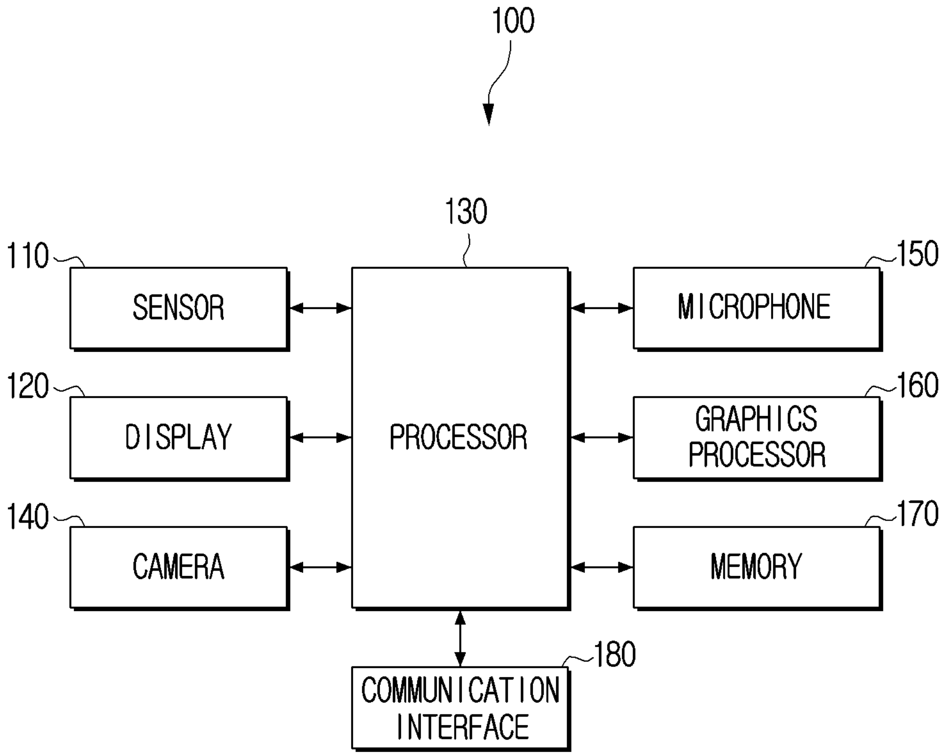
FIG. 15 is a configuration diagram illustrating an electronic device according to one or more embodiments.

FIG. 15 is a configuration diagram illustrating an electronic device according to one or more embodiments.

Referring to FIG. 15, according to one or more embodiments, the electronic device may include the sensor 110, the display 120, the processor 130, a camera 140, a microphone 150, a graphics processor 160, memory 170 and a communication interface 180.

Because descriptions associated with the sensor 110, the display 120, and the processor 130 have been described above, detailed descriptions thereof will be omitted.

The camera 140 may obtain an image. Specifically, if the user is wearing the electronic device 100, an image with respect to the movement of both eyes of the user may be obtained. Based therefrom, the processor 130 may identify the direction of the gaze of the user. In addition, the processor 130 may obtain a plurality of images on a surrounding environment of the user or an external object through the camera 140, and generate map data on the surrounding environment of the user or the external object based on the obtained plurality of images.

Meanwhile, the microphone 150 may receive a voice command of the user. Specifically, the microphone 150 may receive a voice command of the user for performing an interaction related to the virtual object.

The graphics processor 160 may generate a screen including various objects such as icons, images, and texts, for example, virtual environment content using a computation part and a rendering part. The computation part may compute attribute values such as coordinate values, form, size, and color with which each of the objects are to be displayed according to a layout of a screen of the display 120 based on the received control command. The rendering part may generate screens of various layouts including objects based on the attribute values computed from the computation part. The screens generated from the rendering part may be displayed in the display 120.

In the memory 170, an operating system (O/S) for driving the electronic device 100 may be stored. In addition, various software programs or applications for operating the electronic device 100 according to the various embodiments may be stored in the memory 170. the memory 170 may be stored with information with respect to the virtual reality environment, that is, map data corresponding to the virtual reality environment. In addition, the memory 170 may be stored with various information such as various data input, set, or generated during an execution of a program or an application.

The communication interface 180 may transit and receive various information by performing communication between the electronic device 100 and various external devices. Specifically, based on the virtual reality environment being generated based on an actual environment of the user, and the virtual objects which are included in the virtual reality environment matching with actual external electronic devices, the communication interface 180 may transmit a signal corresponding to the voice command of the user with respect to the virtual object to the actual external electronic device that matches with the virtual object.

To this end, the communication interface 180 may include a wireless communicator, a wired communicator, and an input interface. The wireless communicator may perform communication with various external devices using wireless communication technology or mobile communication technology. For the wireless communication technology described above, Bluetooth, Bluetooth Low Energy, CAN communication, Wi-Fi, Wi-Fi Direct, ultrawide band (UWB), ZigBee, Infrared Data Association (IrDA), Near Field Communication (NFC), or the like may be included, and for the mobile communication technology, 3GPP, Wi-Max, Long Term Evolution (LTE), 5G, and the like may be included.

Meanwhile, according to one or more embodiments, the electronic device 100 may provide an augmented reality-based content. That is, the first object, which is an augmented reality content, may be displayed in an image which is displayed in the display 120 after having obtained the image through the camera 140. To this end, the sensor 110 according to one or more embodiments may be implemented as a Time of Flight (ToF) sensor. Further, the processor 130 may identify the distance between the user and the external electronic device through the ToF sensor. Through the above, the processor 130 may display the first object in the display 120 without map data corresponding to the virtual reality environment. According to one or more embodiments, it may be assumed that the processor 130 displays an image obtained through the camera 140 which is not a virtual reality content in the display 120, and the first object is displayed overlapped with the image obtained through the camera 140. That is, the electronic device 100 providing content of an augmented reality corresponds hereto. The processor 130 may display the first object on the image obtained through the camera. Then, the processor 130 may identify a distance with the external electronic device based on a virtual ToF sensor, and adjust the size of the first object based on the identified distance. Meanwhile, to this end, the processor 130 may obtain in advance a position of the external electronic device and the distance with the external electronic device through the ToF sensor, and perform in advance a process of generating map data of the surrounding environment of the user based therefrom. Through the above, the processor 130 may identify the point at which the gaze of the user is positioned on the map data, and set the second object from the identified point. In addition, the size of the second object may also be adjusted based on the distance between the external electronic device and the user sensed based on the ToF sensor.

Meanwhile, methods according to the various embodiments of the disclosure described above may be implemented in an application form installable in an electronic device of the related art.

In addition, the methods according to the various embodiments of the disclosure described above may be implemented with only a software upgrade, or a hardware upgrade for the electronic device of the related art.

In addition, the various embodiments of the disclosure described above may be performed through an embedded server provided in the electronic device, or at least one external server from among the electronic device and a display device.

Meanwhile, according to one or more embodiments, the various embodiments described above may be implemented with software including instructions stored in a machine-readable storage media (e.g., computer). The machine may call an instruction stored in the storage medium, and as a device operable according to the called instruction, may include an electronic device according to the above-mentioned embodiments. Based on a command being executed by the processor, the processor may directly or using other elements under the control of the processor perform a function corresponding to the command. The command may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, respective elements (e.g., a module or a program) according to the various embodiments described above may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity to perform the same or similar functions performed by the respective corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While certain example embodiments the disclosure have been particularly shown and described, it will be understood that various changes in form and details may be made therein without departing from the spirit and scope of the following claims.

What is claimed is:

1. An electronic device, comprising:
- a sensor;
- a display; and
- at least one processor configured to:
  - control the display to display a virtual reality content corresponding to a virtual reality environment;
  - identify a gaze direction of a user based on data obtained through the sensor;
  - identify a point on the virtual reality environment at which the user is gazing based on the gaze direction;
  - identify a distance between the identified point and the user on the virtual reality environment;
  - control the display to display a first object at a position corresponding to the identified point on the virtual reality content;
  - identify, based on a user command received while the first object is displayed, whether a virtual object is present within a second object positioned at the identified point in the virtual reality environment; and
  - control, based on the virtual object being identified as present, the virtual object according to the user command
- wherein at least one of a size of the first object or a size of the second object is determined based on the identified distance.

2. The electronic device of claim 1, wherein the at least one processor is further configured to:
- identify the size of the first object based on the identified distance;
- control the display to display the first object having the identified size at the position corresponding to the identified point on the virtual reality content; and
- identify the virtual object within the second object based on the second object having a fixed size.

3. The electronic device of claim 2, wherein the size of the first object is inversely proportional to the identified distance.

4. The electronic device of claim 2, wherein the at least one processor is further configured to:
- identify a number of virtual objects within the virtual reality environment;
- in a state in which the number of virtual objects is less than a pre-set value, identify the size of the first object based on the identified distance; and
- identify the size of the second object as the fixed size.

5. The electronic device of claim 1, wherein the at least one processor is further configured to:
- identify the size of the second object based on the identified distance;
- control the display to display the first object having a fixed size at the position corresponding to the identified point on the virtual reality content; and
- identify the virtual object within the second object based on the second object having the identified size.

6. The electronic device of claim 5, wherein the size of the second object is proportional to the identified distance.

7. The electronic device of claim 5, wherein the at least one processor is further configured to:
- identify a number of virtual objects within the virtual reality environment;
- in a state in which the number of virtual objects is greater than or equal to a pre-set value, identify the size of the first object as the fixed size; and
- identify the size of the second object based on the identified distance.

8. The electronic device of claim 1, wherein the at least one processor is further configured to:
- identify the size of the first object based on the identified distance and identify the size of the second object as a fixed size in a state in which the identified distance is less than a pre-set value; and
- identify the size of the first object as the fixed size and identify the size of the second object in the identified distance in a state in which the identified distance is greater than or equal to the pre-set value.

9. A method for controlling an electronic device, the method comprising:
- displaying a virtual reality content corresponding to a virtual reality environment;
- identifying a gaze direction of a user based on data obtained through a sensor;
- identifying a point on the virtual reality environment at which the user is gazing based on the gaze direction;
- identifying a distance between the identified point and the user on the virtual reality environment;
- displaying a first object at a position corresponding to the identified point on the virtual reality content;
- identifying, based on a user command received while the first object is displayed, whether a virtual object is present within a second object positioned at the identified point in the virtual reality environment; and
- controlling, based on the virtual object being identified as present, the virtual object according to the user command,
- wherein at least one of a size of the first object or a size of the second object is determined based on the identified distance.

10. The method of claim 9, wherein the identifying the distance between the identified point and the user on the virtual reality environment comprises identifying the size of the first object based on the identified distance,
- wherein the displaying the first object at the position corresponding to the identified point on the virtual reality content comprises displaying the first object having the identified size at the position corresponding to the identified point on the virtual reality content, and
- wherein the identifying whether the virtual object is present within the second object positioned at the identified point in the virtual reality environment comprises identifying a virtual object within the second object based on the second object having a fixed size.

11. The method of claim 10, wherein the size of the first object is inversely proportional to the identified distance.

12. The method of claim 10, further comprising:

identifying a number of virtual objects within the virtual reality environment;

in a state in which the number of virtual objects is less than a pre-set value, identifying the size of the first object based on the identified distance; and identifying the size of the second object as the fixed size.

13. The method of claim 9, wherein the identifying the distance between the identified point and the user on the virtual reality environment comprises identifying the size of the second object based on the identified distance, wherein the displaying the first object at the position corresponding to the identified point on the virtual reality content comprises displaying the first object having a fixed size at the position corresponding to the identified point on the virtual reality content, and wherein the identifying whether the virtual object is present within the second object positioned at the identified point in the virtual reality environment comprises identifying the virtual object within the second object based on the second object having the identified size.

14. The method of claim 13, wherein the size of the second object is proportional to the identified distance.

15. The method of claim 13, further comprising:

identifying a number of virtual objects within the virtual reality environment;

in a state in which the number of virtual objects is greater than or equal to a pre-set value, identifying a size of the first object as the fixed size; and identifying the size of the second object based on the identified distance.

16. The method of claim 9, further comprising:

identifying the size of the first object based on the identified distance and identify the size of the second object as a fixed size in a state in which the identified distance is less than a pre-set value; and identifying the size of the first object as the fixed size and identify the size of the second object in the identified distance in a state in which the identified distance is greater than or equal to the pre-set value.

17. A non-transitory computer readable recording medium storing computer instructions that cause an electronic device to perform an operation when executed by at least one processor of the electronic device, wherein the operation comprises;

displaying a virtual reality content corresponding to a virtual reality environment;

identifying a gaze direction of a user based on data obtained through a sensor;

identifying a point on the virtual reality environment at which the user is gazing based on the gaze direction;

identifying a distance between the identified point and the user on the virtual reality environment;

displaying a first object at a position corresponding to the identified point on the virtual reality content;

identifying, based on a user command received while the first object is displayed, whether a virtual object is present within a second object positioned at the identified point in the virtual reality environment; and controlling, based on the virtual object being identified as present, the virtual object according to the user command, wherein at least one of a size of the first object or a size of the second object is determined based on the identified distance.

18. The medium of claim 17, wherein the identifying the distance between the identified point and the user on the virtual reality environment comprises identifying the size of the first object based on the identified distance, wherein the displaying the first object at the position corresponding to the identified point on the virtual reality content comprises displaying the first object having the identified size at the position corresponding to the identified point on the virtual reality content, and wherein the identifying whether the virtual object is present within the second object positioned at the identified point in the virtual reality environment comprises identifying a virtual object within the second object based on the second object having a fixed size.

19. The medium of claim 18, wherein the size of the first object is inversely proportional to the identified distance.

20. The medium of claim 18, further comprising:

identifying a number of virtual objects within the virtual reality environment;

in a state in which the number of virtual objects is less than a pre-set value, identifying the size of the first object based on the identified distance; and identifying the size of the second object as the fixed size.

* * * * *